(12) United States Patent
Griffin et al.

(10) Patent No.: US 9,143,524 B2
(45) Date of Patent: Sep. 22, 2015

(54) PROPAGATION OF MALICIOUS CODE THROUGH AN INFORMATION TECHNOLOGY NETWORK

(75) Inventors: Jonathan Griffin, Bristol (GB); Andrew Patrick Norman, Bristol (GB); Richard James Smith, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 2817 days.

(21) Appl. No.: 11/494,289

(22) Filed: Jul. 26, 2006

(65) Prior Publication Data

US 2007/0083913 A1    Apr. 12, 2007

(30) Foreign Application Priority Data

Oct. 12, 2005 (GB) .................................. 0520712.1

(51) Int. Cl.
| | |
|---|---|
| G06F 11/00 | (2006.01) |
| G06F 7/04 | (2006.01) |
| H04L 29/06 | (2006.01) |
| G06F 21/56 | (2013.01) |

(52) U.S. Cl.
CPC ............ *H04L 63/1441* (2013.01); *G06F 21/56* (2013.01)

(58) Field of Classification Search
USPC ......... 726/23–25, 11, 3.23; 709/227; 713/185
See application file for complete search history.

(56) References Cited

U.S. PATENT DOCUMENTS

| | | | | |
|---|---|---|---|---|
| 5,822,434 | A * | 10/1998 | Caronni et al. ............... | 713/156 |
| 7,096,272 | B1 * | 8/2006 | Raman ........................... | 709/231 |
| 7,380,277 | B2 * | 5/2008 | Szor .............................. | 726/24 |
| 7,506,372 | B2 * | 3/2009 | Mulrane et al. ................ | 726/22 |
| 7,552,237 | B2 * | 6/2009 | Cernohous et al. ........... | 709/245 |
| 7,561,515 | B2 * | 7/2009 | Ross .............................. | 370/232 |
| 7,562,130 | B2 * | 7/2009 | Dillon et al. .................. | 709/223 |
| 7,565,423 | B1 * | 7/2009 | Fredricksen .................. | 709/223 |
| 7,814,542 | B1 * | 10/2010 | Day ................................ | 726/22 |
| 7,818,679 | B2 * | 10/2010 | Clarke .......................... | 715/751 |
| 2003/0028639 | A1 | 2/2003 | Yamamoto et al. | |
| 2003/0056094 | A1 * | 3/2003 | Huitema et al. ............. | 713/157 |
| 2003/0161263 | A1 * | 8/2003 | Enns et al. .................... | 370/229 |
| 2004/0103015 | A1 * | 5/2004 | Schaffrath et al. ............ | 705/8 |
| 2004/0218615 | A1 | 11/2004 | Griffin et al. | |
| 2004/0255159 | A1 * | 12/2004 | Williamson et al. .......... | 713/201 |
| 2005/0265233 | A1 * | 12/2005 | Johnson et al. ............... | 370/229 |
| 2005/0289245 | A1 * | 12/2005 | Griffin et al. ................. | 709/249 |

(Continued)

FOREIGN PATENT DOCUMENTS

| | | | |
|---|---|---|---|
| GB | 2391419 | * | 4/2004 |
| WO | WO-2005081493 A1 | | 9/2005 |

*Primary Examiner* — Abu Sholeman
(74) *Attorney, Agent, or Firm* — Hewlett-Packard Patent Department

(57) ABSTRACT

A method of restricting transmission of data packets from a host entity in a network, including: transmitting outgoing packets to destination hosts whose identities are contained in a record stored in a working set of host identity records; over the course of repeated predetermined time intervals, restricting, to a predetermined number, destination hosts not identified in the working to which packets may be transmitted; upon transmission of a packet to a host whose identity is not contained in a record in the working set, adding a record containing the host's identity to the working set and attributing a time to live to the record; deleting each record from the working set whose time to live has expired.

14 Claims, 15 Drawing Sheets

(56) References Cited

U.S. PATENT DOCUMENTS

| | | | |
|---|---|---|---|
| 2006/0023637 A1* | 2/2006 | Griffin et al. | 370/252 |
| 2006/0072451 A1* | 4/2006 | Ross | 370/229 |
| 2006/0075506 A1* | 4/2006 | Sanda et al. | 726/26 |
| 2006/0230456 A1* | 10/2006 | Nagabhushan et al. | 726/25 |
| 2007/0088845 A1* | 4/2007 | Memon et al. | 709/234 |
| 2007/0104180 A1 | 5/2007 | Aizu et al. | |
| 2010/0250743 A1* | 9/2010 | Memon et al. | 709/224 |
| 2011/0173675 A9* | 7/2011 | Griffin et al. | 726/3 |

* cited by examiner

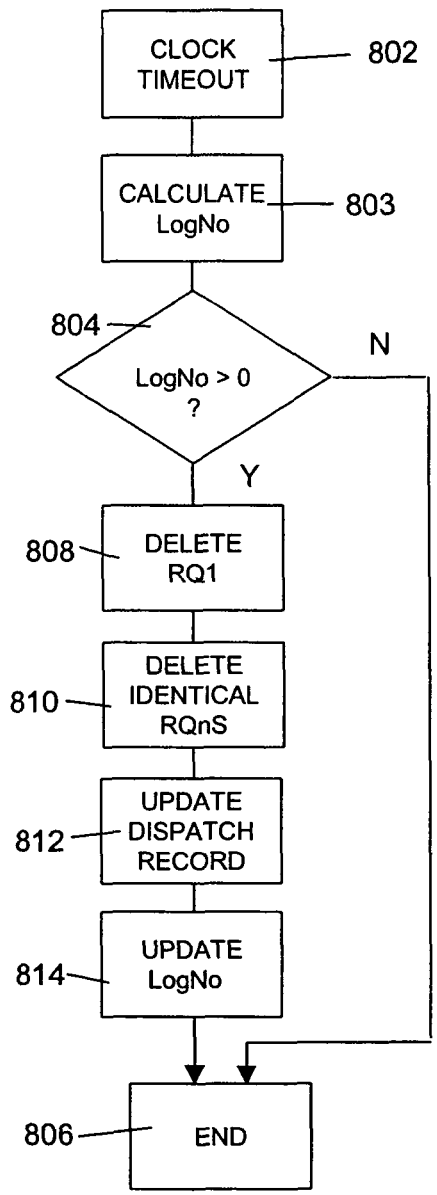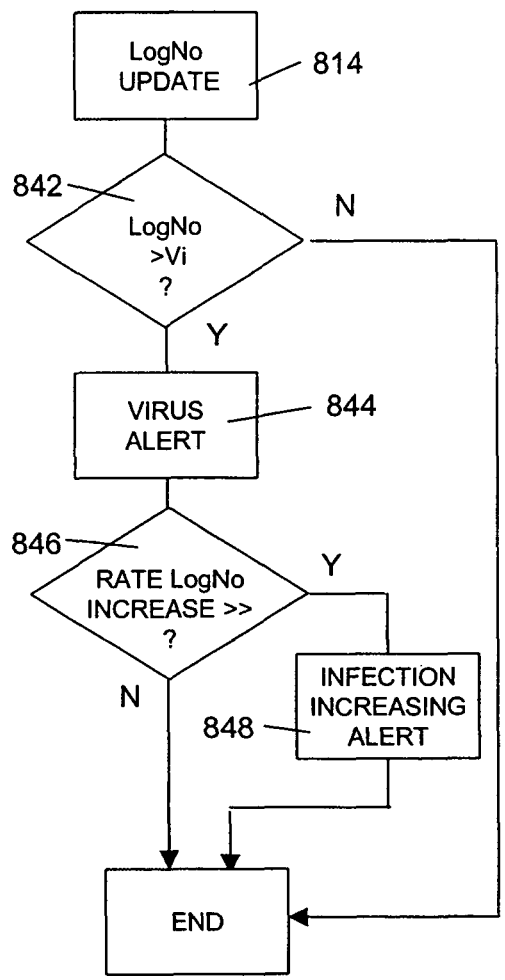
Fig. 8A
Fig. 8B

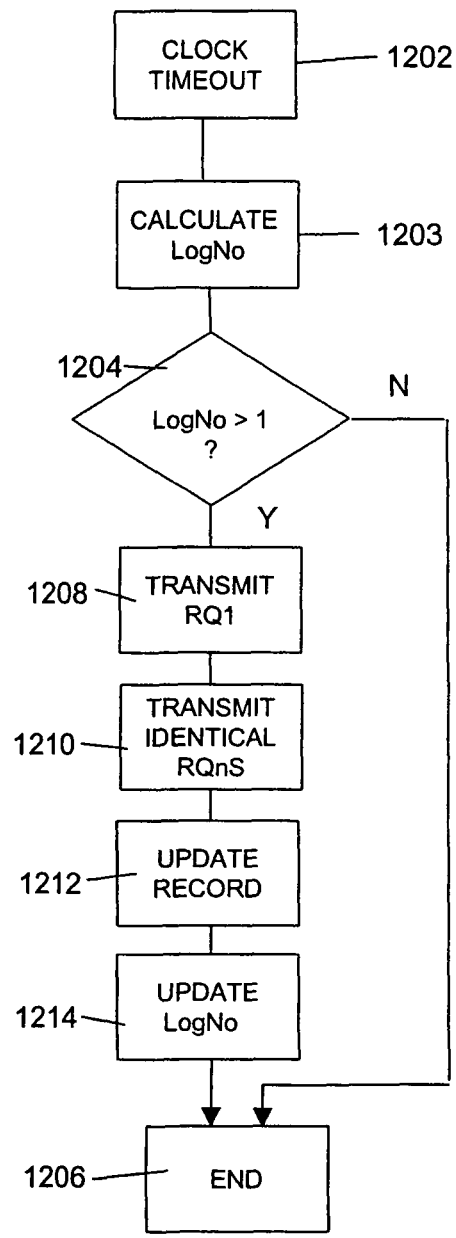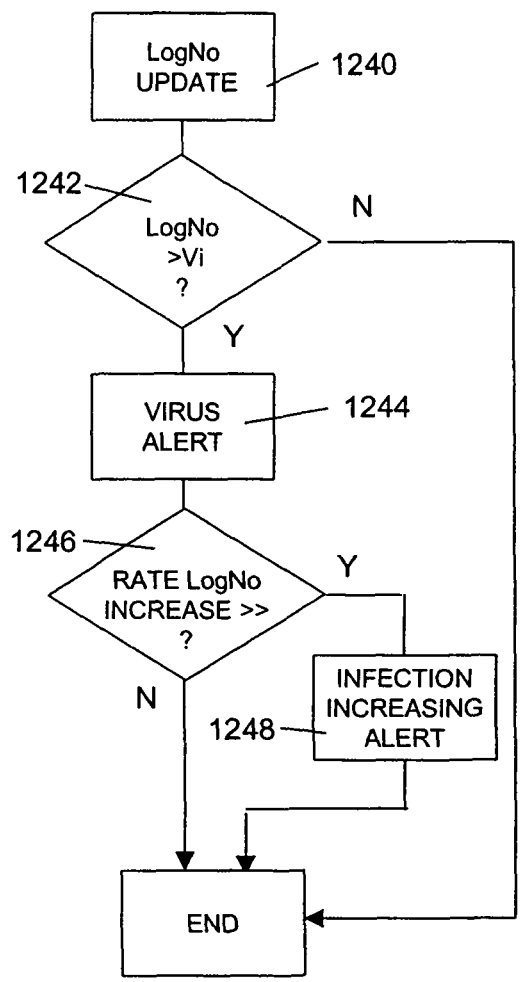
Fig. 12A
Fig. 12B

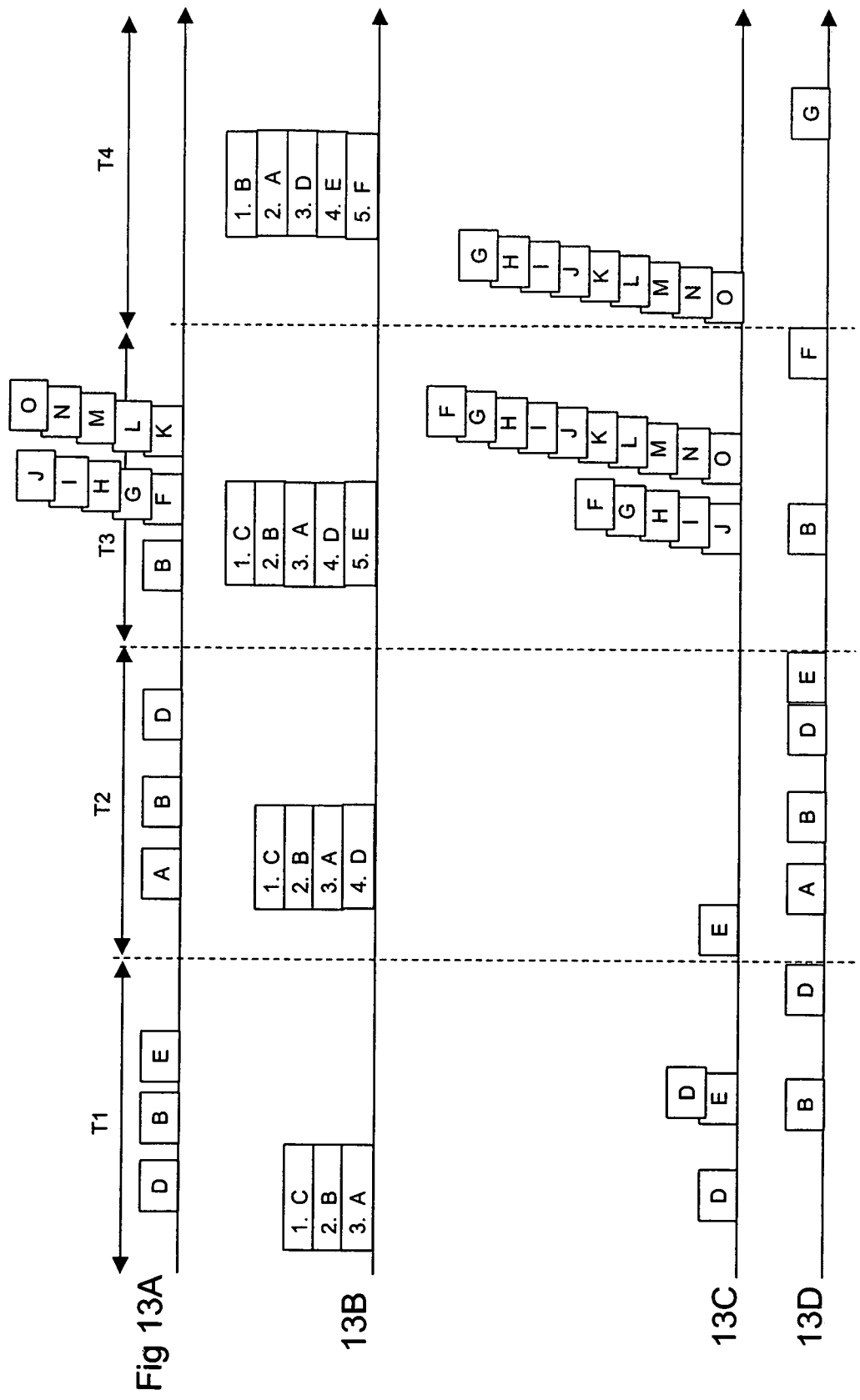

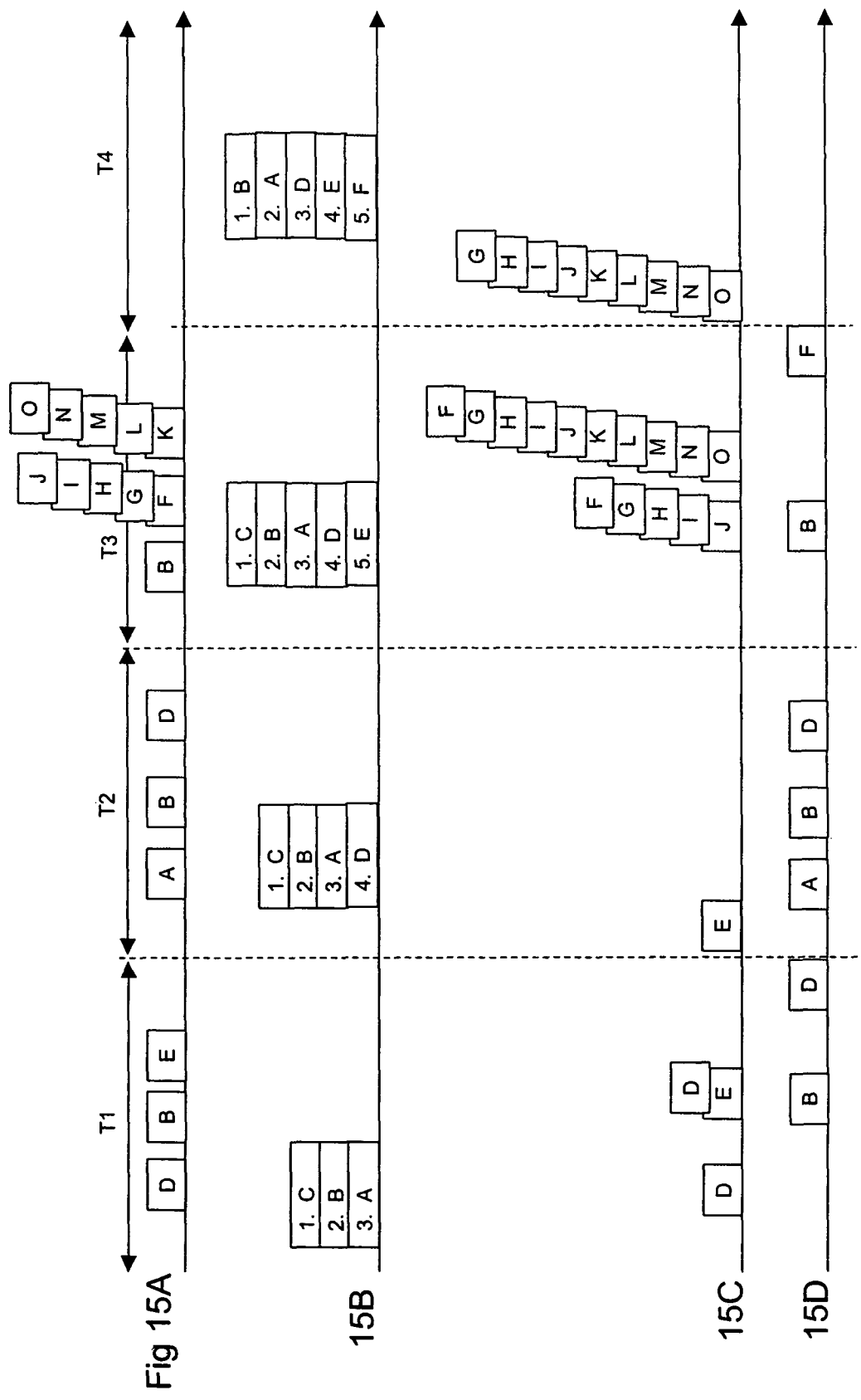

PROPAGATION OF MALICIOUS CODE THROUGH AN INFORMATION TECHNOLOGY NETWORK

CROSS REFERENCE TO RELATED APPLICATIONS

This application is related to U.S. patent application Ser. No. 11/494,291, filed on Jul. 26, 2006 and to U.S. patent application Ser. No. 10/833,057, filed on Apr. 28, 2004, which claims the benefit of priority to GB Application No. 0309858.9, filed on Aug. 29, 2003. The entire disclosures thereof are incorporated herein by reference.

BACKGROUND TO THE INVENTION

1. Field of the Invention

The present invention relates to the propagation of malicious code through a network of interconnected computing entities, and to the restriction of the propagation of such code.

In current network environments virtually any computing entity (or "host") is at one time or another connected to one or more other hosts. Thus for example in the case of an IT environment, a host in the form of a computer (such as a client, a server, a router, or even a printer for example) is frequently connected to one or more other computers, whether within an intranet of a commercial organisation, or as part of the Internet. Alternatively, in the case of a communications technology environment, a host in the form of a mobile telephone is, merely by virtue of its intrinsic purpose, going to be connected to one or more other hosts from time to time, and an inevitable result is that the opportunities for the propagation of malicious code are enhanced as a result.

Within the context of this specification malicious code is data which is assimilable by a host that may cause a deleterious effect upon the performance of either: the aforesaid host; one or more other hosts; or a network of which any of the above-mentioned hosts are a part. One characteristic of malicious code is that it propagates either through self-propagation or through human interaction. Thus for example, viruses typically act by becoming assimilated within a first host, and subsequent to its assimilation may then cause deleterious effects within that first host, such as corruption and/or deletion of files. In addition the virus may cause self-propagation to one or more further hosts at which it will then cause similar corruption/deletion and further self-propagation. Alternatively a virus may merely be assimilated within the first host and cause no deleterious effects whatsoever, until it is propagated to one or more further hosts where it may then cause such deleterious effects, such as, for example, corruption and/or deletion of files. In yet a further alternative scenario, malicious code such as a worm may become assimilated within a first host, and then cause itself to be propagated to multiple other hosts within the network. The worm may have no deleterious effect upon any of the hosts by whom it is assimilated, however the self-propagation through the network per se may be of a sufficient magnitude to have a negative effect on the speed of "genuine" network traffic, so that the performance of the network is nonetheless affected in a deleterious manner. One example of such a worm is the Code Red worm which, once assimilated within a host operates automatically to generate Internet Protocol ("IP") addresses of other potential hosts at random, and then instructs the host to send a copy of the worm to each of these randomly-generated IP addresses. Although not all of the randomly-generated IP addresses may actually be occupied by hosts, sufficient of them are to enable the worm to self propagate rapidly through the Internet and harm the performance of the network as a result of the amount of extra traffic generated. These three examples given above are intended for illustration of the breadth of the term malicious code, and are not intended to be regarded in any way as exclusively definitive.

It has been established that in situations where malicious code is likely to cause deleterious effects upon either one or more hosts or the network infrastructure as a whole, one of the most important parameters in attempting to limit and then to reverse such effects is the speed of its propagation. Human responses to events are typically one or more orders of magnitude slower than the propagation speeds of malicious code, and so substantial difficulties are frequently apt to arise within a network before any human network administrator is either aware of the problem, or capable of doing anything to remedy it. Therefore any reduction in the initial rate of propagation of malicious code through a network is likely to be of benefit to attempts to limit any negative effects, and/or to remedy them.

2. Description of Related Art

One existing and relatively popular approach to tackling the problems of the propagation of malicious code within a network may be thought of as an absolutist approach. Infection is prevented using what is known, in common usage as 'virus-checking' software (although, in fact, it typically will operate to check for all forms of known infection by worms, Trojan Horses, spyware and so on), which attempts to check all incoming data, for example email attachments. If subsequently an infection is discovered within a host, that host is typically removed from the network immediately, and the infection removed. In accordance with this philosophy each host may be thought of as contributing to protecting the network against widespread infection firstly by avoiding incidence of infection, and secondly in the event of infection, by its sacrificial removal from the network.

SUMMARY OF THE INVENTION

The present invention provides alternative approaches to infection and propagation of viruses in a network of hosts. The invention is set out in the claims.

BRIEF DESCRIPTION OF DRAWINGS

Embodiments of the invention will now be described, by way of example, and with reference to the accompanying drawings, in which:

FIGS. 8A and B are flowcharts illustrating further aspects of embodiments of methods;

FIGS. 12A and B are flow charts illustrating the operation of further aspects of a method;

FIGS. 13A-D illustrate a method according to a further embodiment;

FIGS. 15A-D illustrate a method according to a further embodiment.

DESCRIPTION OF PREFERRED EMBODIMENTS

Various embodiments of the present invention will be exemplified by illustrating the operation and, where appropriate, interoperation of various computing entities which provide 'hosts' for malicious code. In the context of this specification, a computing entity or computing environment capable of providing such a host is an entity which has the capacity to perform one or more computing operations independently of any other computing entities with which it may, from time to time, be capable of communicating. Thus, for example, a computing entity can simply be a personal computer, whether acting in a client role or a server role; alternatively a computing entity may be a server, that is to say a hardware computing platform manufactured expressly for the purpose of operating in the role of a server to a large number of client computers. In a further example, several virtual computing environments may exist on a single hardware platform, such as, for example, by virtue of the provision of two or more independent operating systems on the platform. Each such operating system, representing a virtual independent and separate computing environment may be regarded as a separate computing "entity." Further, in the case of such an example, each such operating system may (depending upon the manner in which virtualisation is achieved) operate on top of an over-arching, central operating system, which itself can be regarded as a separate computing entity to each of the entities provided by the virtualising operating systems whose operation it supports. In yet a further example, different software applications which run on the same operating system may be regarded as separate computing entities, for example when they make client-role requests independently of each other.

It follows, therefore, that multiple computing entities can exist as, for example: multiple hardware platforms; multiple software computing entities on a single hardware platform (wherein the hardware platform itself may constitutes a separate computing entity); or a multiplicity of software computing entities in a hierarchy, for example with one or more software computing entities may be nested within one or more other software computing entities. This list is not intended to be either exhaustive nor exclusively definitive, but rather illustrative. Further, to simplify the exemplification of the various embodiments of the present invention, the term computing entity will not be employed exhaustively. Thus, for example, a software application that may properly be regarded as a separate computing entity to the operating system or hardware platform on which it is running may not be explicitly referred to as such, for example because its role as such a separate entity providing a separate host for malicious code doesn't have a part to play in the illustrated example.

Figure 1:
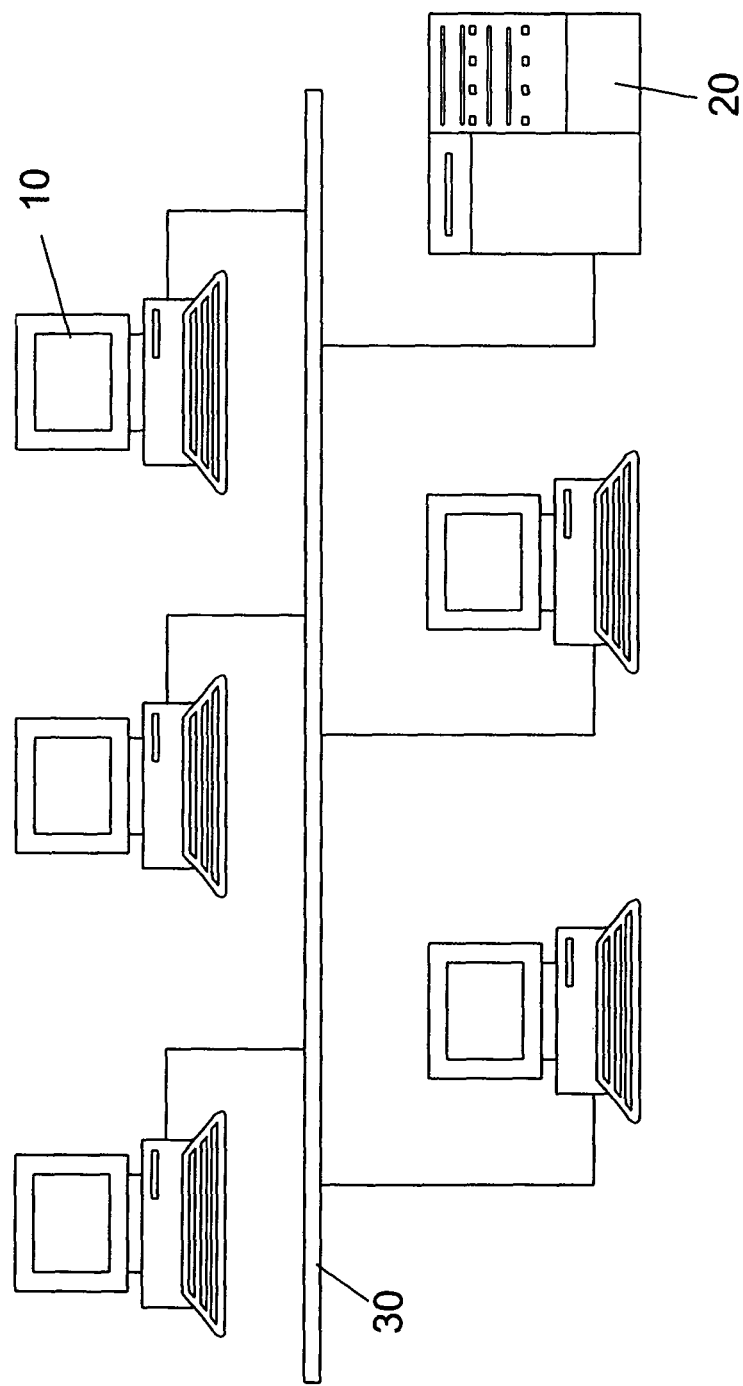
FIG. 1 is a schematic representation of one form of network architecture.
Figure 2:
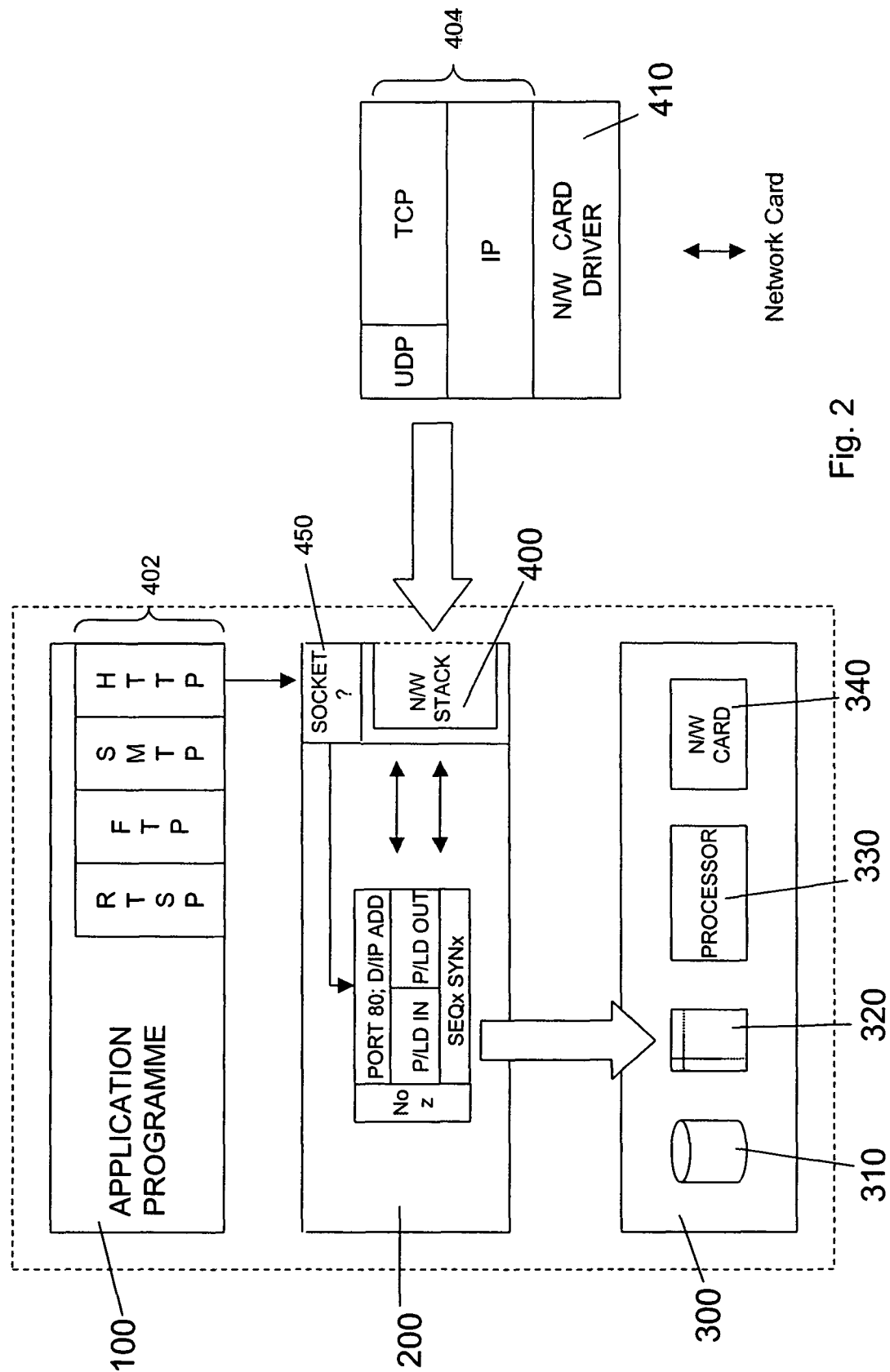
FIG. 2 is a schematic illustration of the conventional operational architecture of a computing entity forming a part of, for example, the network of FIG. 1.

Referring now to FIG. 1, one typical form of network includes a plurality of client computing entities or hosts, here having the form of personal computers 10, and a server computing entity 20 each of which is connected to a network backbone 30. In the present example, each of the computing entities has a similar architecture enabling dispatch and receipt of data from other entities connected to the network. The architecture of a personal computer 10, and it's mode of operation is well-known per se, but will nonetheless be described in some detail herein in order to provide a proper illustration of the context for an embodiment of the present invention, and an indication of the potential breadth of some of the terms used to define the invention in the claims. Referring now to FIG. 2, each of the entities includes what may be thought of as three functional parts: one or more application programs 100, which in general terms may be thought of as enabling implementation of a particular task that a user of the entity may wish to perform, such as browsing the Internet, word processing and so on; hardware 300 (such as a hard drive 310, memory 320, a processor 330, and a network card 340); and an operating system 200. The operating system 200 may be thought of, in part, as an interface between the applications programs and the hardware, performing scheduling of tasks required by applications programs, and allocates memory and storage space amongst other things. The operating system 200 may, in accordance with this way of describing the architecture of a computing entity, also include a hierarchy, or stack 400 of programs which provide the entity in question with the ability to dispatch and receive data to and from other entities in the network, in accordance with a number of different sets of formal rules governing the transmission of data across a network, known as protocols. The network stack 400 may be thought of as being inserted into the operating system so that the two operate in conjunction with each other. The stack 400 includes a strata of low level programs which provide for the implementation of low level protocols 404, concerned for example with the formation of bundles of data known as "packets" (which will be discussed in more detail later), the order in which bytes of data are to be sent and, where appropriate, error detection and correction. A further, high level strata of protocols, usually implemented within applications programs ("application protocols"), operate in conjunction with the low-level protocols to provide for the dispatch and receipt of data at the behest of applications programs. In the present example various applications programs use one or more of four different high level protocols 402; RTSP (real time streaming protocol), FTP (file transfer protocol), SMTP (simple mail transfer protocol—used for email), and HTTP (hyper text transfer protocol—used primarily in internet related applications), and the operating system implements two low level protocols 404: UDP (User Datagram Protocol for use with RTSP), and TCP (Transfer Control Protocol for use with the remaining three application protocols). Both of the low-level protocols are implemented above and in conjunction with Internet Protocol (IP). Finally, the network stack 400 includes a system program known as a driver 410, which in essence is low-level software that controls the network card (the circuit board on the personal computer 10 which provides a physical connection to the network).

In the present illustrated examples, the process of establishing a connection in accordance with HTTP will be considered. Usually a request for such a connection is made by the web browser application program, and this in turn is most likely to be at the behest of a user operating the web browser.

Where this is the case, the request will identify the address or "URL" within the network of the computing entity with which a connection is sought, initially using alphanumeric characters entered at the address bar of the browser application program (for example http://www.hp.com). Ultimately however these are "resolved" into a numerical "IP address" of the form: xxx.xxx.xxx.xxx, where xxx is an integer between 0 and 255 inclusive. An example of an IP address is 15.144.2.3. The IP address is subsequently further resolved into what is known as a physical, or Media Access Control ("MAC") address of the network card of the destination computing entity. Resolution of the URL into an IP address, and the IP address to a MAC address takes place at a variety of computing entities within the network, in a manner which is well known per se, and will not be described further herein. This description of the connection process in accordance with HTTP, well known per se, has described connections legitimately requested by a user, and by means of a URL. However it should be appreciated that it is possible for example to request a connection from the web browser application program using an IP address, rather than the alphanumeric characters of the 'hostname' (the part of the URL which follows the characters "http://"). This is an aspect of the system behaviour which has been exploited by viruses, some of which randomly generate IP addresses in accordance with the rules governing their allowable format, and then seek connection to those randomly generated addresses.

Figure 3:
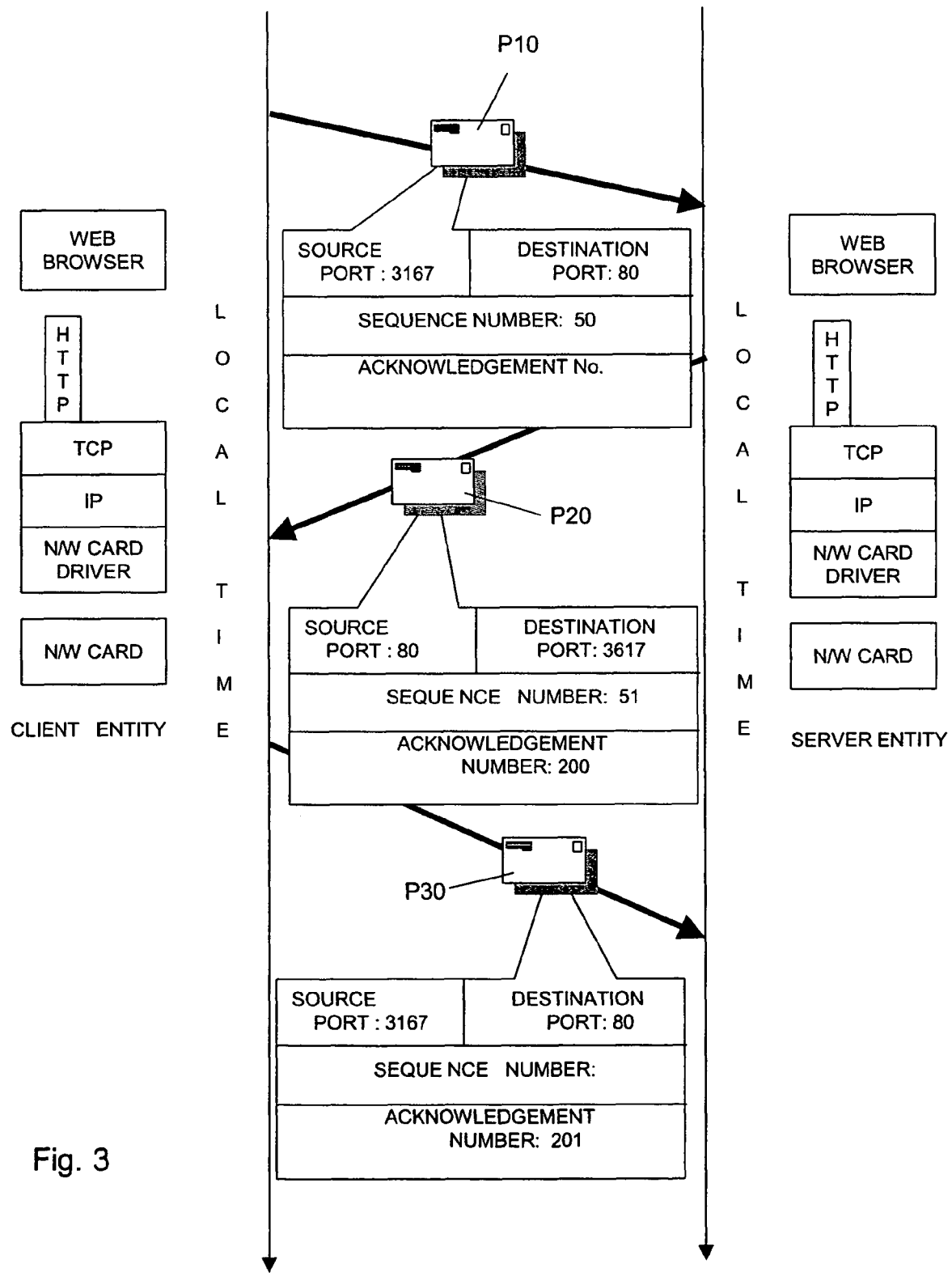
FIG. 3 is a schematic illustration of establishment of a connection in accordance with an application protocol from FIG. 2.

In the context of the present application it should be appreciated that the term "connection" is a term of art, and is used to refer to a manner of transmitting messages in which acknowledgement of receipt of data is required, so that in the absence of an acknowledgement the connection is deemed either not to have been established, or to have failed, and the transmitted message deemed not to have arrived. One application protocol which operates using connections is HTTP, and an example of the establishment of a connection in accordance with HTTP will now be described with reference to FIGS. 2 and 3. A connection in accordance with HTTP is typically established at the behest of a web browser application program (i.e. a program in the applications layer 100 in FIG. 2) within the client entity, which requests a connection with a server entity, for example. When an Application program such as a web browser seeks to establish a connection with another computing entity, it initially requests what is known as a socket 450 from the operating system. A socket is effectively an allocated memory space in which data relating to the communication sought by the web browser (in this instance) is stored. Upon receiving a request for a socket, the operating system duly creates or "opens" one (which in effect means that memory is allocated), and returns a socket number, which is the identifier for that particular socket. In FIG. 2 the particular socket is indicated by reference numeral 450, and the number of the socket is "z", while the part of the operating system which allocates the socket is shown as a "layer" above the network stack 400, by which it is sought to indicate that, from a methodological perspective, use of the socket (further uses of which will subsequently be described) in the case of outgoing data, precedes the passage of data from the application program through the network stack. Once a socket has been opened, the web browser then requests that the socket z is "bound" firstly to the IP address with which a connection is sought, and secondly with a parameter known as the "port" number (which is essentially a label identifying the application protocol used). 'Binding' takes place by writing these parameters in the socket (which in due course will additionally contain further data). The port number for connections via HTTP is usually port 80. Once a socket has been created and bound the browser then requests that a connection be established, and this causes the emission of what is known as a data packet P10 (shown in FIG. 3) to the destination computing entity. The requesting packet P10 contains: an identification of the destination port on the server which is handling the request, i.e. an identification of the suitable application protocol for handling messages transmitted over the requested connection (here, because the connection is established in accordance with HTTP, port 80); a source port which the client will use (here 3167) which is an arbitrary number (but one which is not: (i) already in use at that time, and (ii) not already allocated as a standard number to define a port identified in accordance with established standards) and whose purpose is to provide, to the client requesting the connection, an identification of the connection in acknowledgement messages (e.g., since it is entirely possible that there may simultaneously be two are more connections using the same protocol this may be used to distinguish one such connection from the other); a flag indicating that the synchronisation status of the requesting entity is set to "on" (meaning that sequence numbers—which indicate the order of the packet in a total number of packets sent—between the requesting and destination computing entity are to be synchronised), and an initial sequence number 50 (this could be any number). Upon receipt of this packet, the destination machine sends back a packet P20 identifying the source port as 80, the destination port as 3167, a flag indicating that the acknowledgement status is "on", an acknowledgement number 51 which augments the sequence number by one, and its own synchronisation flag number 200. When the requesting entity receives this packet it returns a further packet P30 once again identifying the source and destination ports, and a flag indicating that its acknowledgement status is on, with an acknowledgement number 201 (i.e. which augments the sequence number by one). Once this exchange is complete, a connection between the client and server entities is defined as being open, and both the client and server entities send messages they receive up through their respective network stacks to the relevant application programs indicating that a connection is open between them. In connection with the socket, it should also be noted that the socket comprises an area 460 allocated to store the actual body of the message which it is desired to transmit (sometimes known as the outbound message content, or the outgoing payload), and similarly a further area 470 allocated to store the body of messages which are received (inbound message content, or incoming payload).

When the outgoing payload is to be transmitted, the TCP layer breaks it up into packets (i.e. data structures such as those illustrated above in FIG. 3, but further including at least part of the payload), and the IP layer attaches an IP address header. When an incoming message arrives, it passes up through the network stack, i.e. from the network card 340, up through the program implementing the Internet Protocol etc., and is written in to the relevant socket (as identified, inter alia from the port number), from which the application program retrieves the incoming payload.

Data may alternatively be transmitted using the protocols RSTP/UDP/IP (indicating the hierarchy of protocols in the network stack adopted in conjunction with each other to transmit the data) which do not require a connection; the dispatching entity sends a packet to the destination entity, and does not require an acknowledgement of receipt.

Figure 4:
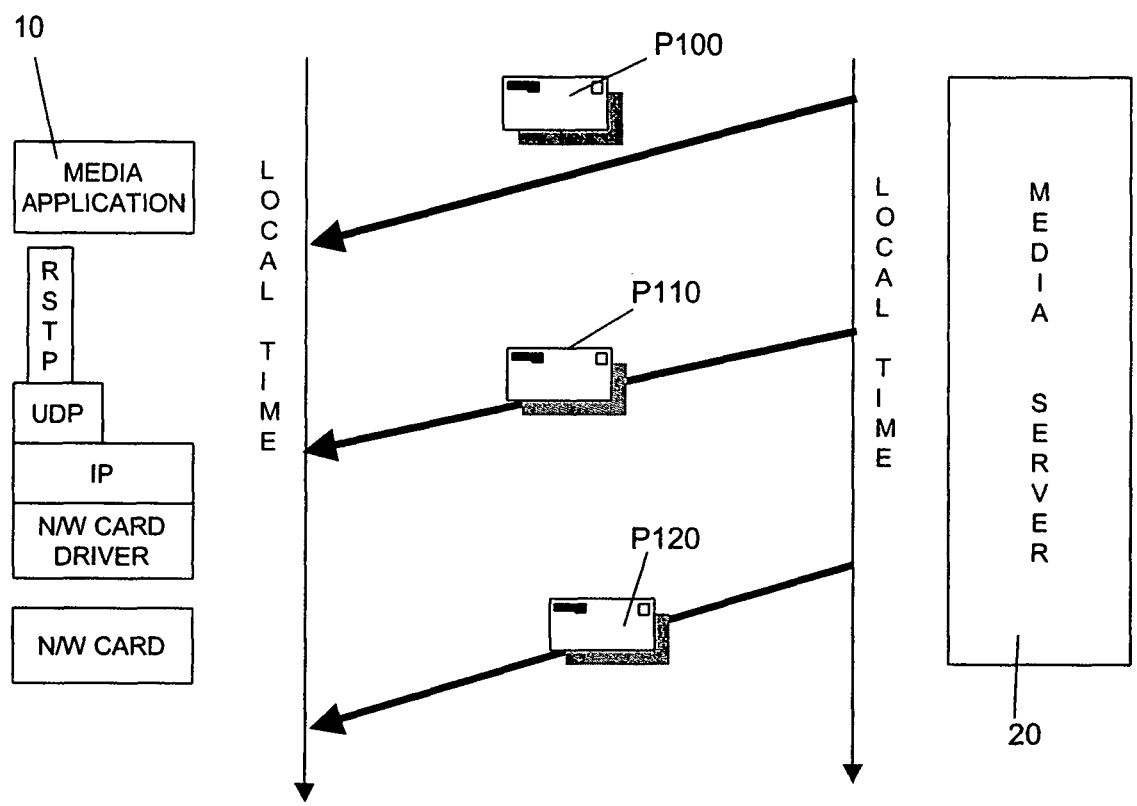
FIG. 4 is a schematic illustration of data transmission in accordance with a further application protocol from FIG. 2.

Referring now to FIG. 4, when transmitting data in accordance with RTSP/UDP, media for example is streamed to a client entity 10 from a media server 20 in a series of packets P100, P120, P120 . . . , and the client does not acknowledge receipt of any of them. Streaming in accordance with this protocol typically follows an initial request to establish a connection between the client and the server by some other connection based protocol, for the purpose of identifying a destination port on the client, amongst other things.

Figure 5:
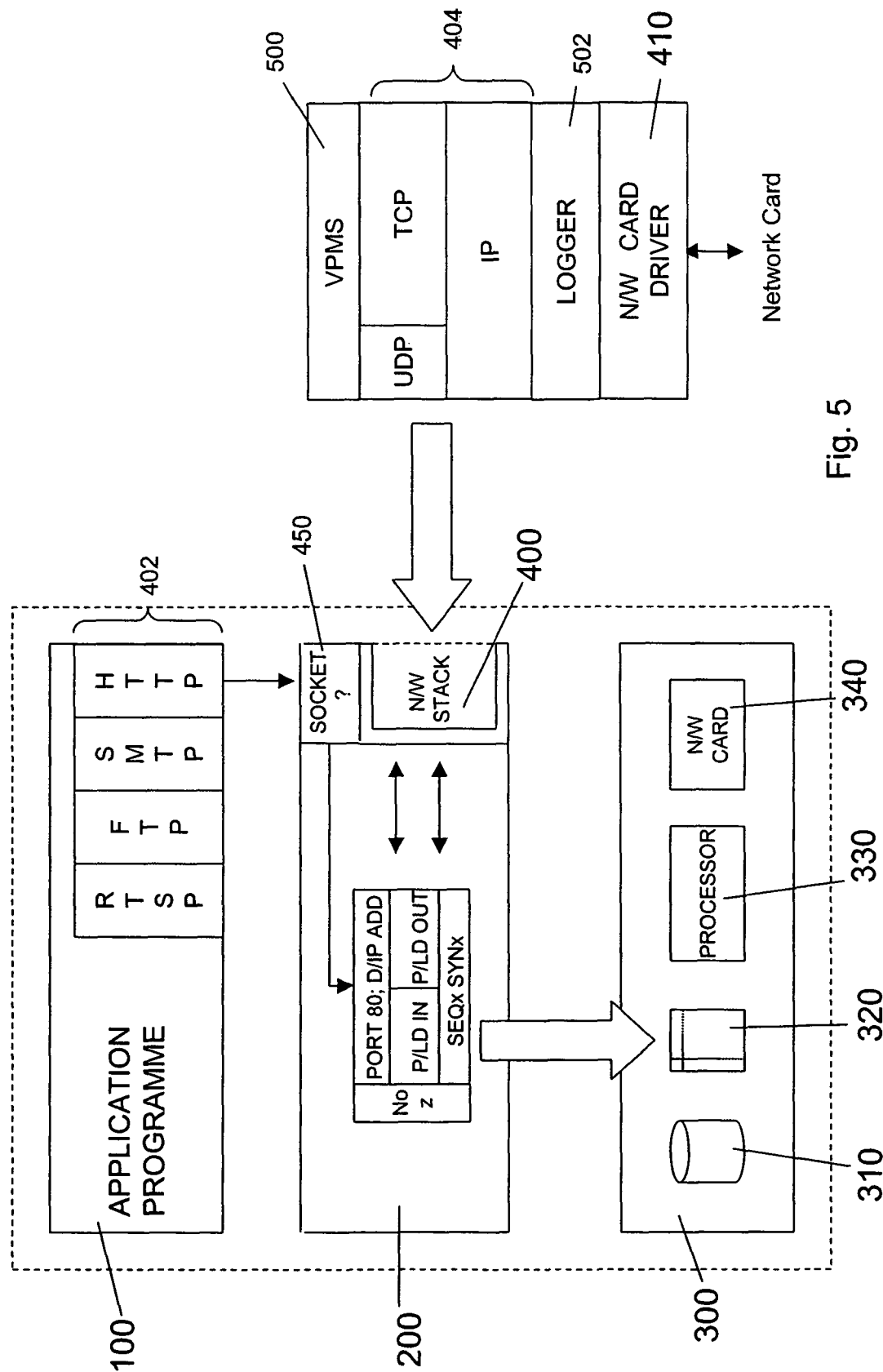
FIG. 5 is a schematic illustration of an operational architecture according to an embodiment of the present invention of a computing entity forming a part of a network.

Thus far all that has been described is entirely conventional. Referring now to FIG. 5, in accordance with a first embodiment of the present invention, a layer of malicious code monitoring software (MCMS) 500, runs as a 'shim' within the network stack of one or more of the personal computers within the network. The MCMS acts as a gateway for all outbound data from the or each computing entity which requires, in order to communicate, to transmit data via the network stack within which it is running. Accordingly, depending upon the manner in which a hardware platform is configured, a single MCMS may provide a gateway for all outgoing data from a given hardware platform. In the case of a single hardware platform providing several virtually independent computing environments by different operating systems, there are many different ways of configuring the virtualized environments to enable implementation of the hierarchy of protocols. It follows that, depending upon how many of the virtual entities pass packets through the point in a network stack at which an MCMS is located, an MCMS may provide a gateway for only one, several or all of the virtual computing environments on a single hardware platform. Preferably the MCMS will be located lower down the network stack, since, to the extent that plural entities may use a common stack or part of a stack, the lower in the stack the MCMS is located the more entities it is likely to operate as a gateway for. The MCMS operates to monitor the propagation of malicious code within the network by observing what is, in accordance with a predetermined policy, defined as "unusual" behavior in contacting other entities (also known as "hosts", since they may act as hosts for infection by malicious code) within the network. It has been established that in many networks, normal (i.e. non-malicious) network traffic is characterized by a relatively low frequency of events in which data is sent to destination hosts (i.e. hosts which are the intended destination for data) within the network which have previously not been contacted. In contrast, in the case of malicious code, traffic is often characterised characterized by a relatively high frequency events in which data is dispatched (or attempts are made to dispatch data) to previously un-contacted destination hosts. Broadly speaking, the function of the MCMS is to monitor abnormal traffic, as defined in accordance with a predetermined policy, and to record or restrict such abnormal traffic, depending upon the policy of the administrator.

In the present example the MCMS operates upon the basis of a series of time intervals or time windows, which in the present illustrated example are of predetermined and constant length Tn. In any given time window Tn the MCMS monitors requests to send data to destination hosts, and maintains a record containing the identities of destination hosts recently contacted, also known as the 'working set'. A destination host is classified as 'new' if it is not identified in the working set. The MCMS records requests to send data to new destination hosts, and, in the present embodiment, restricts the transmission of data to a predetermined number of new destination hosts per time window.

The number of destination host identities which the working set will hold and the time interval Tn are determined on the basis of the policy, typically defined by a system administrator, and the policy is preferably formulated to take account of the nature of non virally-related network traffic. In this way, the MCMS operates to monitor or restrict the speed at which malicious code resident on the host may propagate from that host to other hosts within the network.

Referring to FIG. 6A, over the course of a time window T1, various applications programs running on the personal computer 10 send what can be thought of as requests via the MCMS to send data (whether by connection or otherwise) to other hosts within the network ("outbound requests"): the email application program, which requests dispatch of an email message (having multiple addressees) to a mail server, Mail (Request A) using SMTP; the file management application program requesting dispatch of a file recording a text document to another user (Request B) via FTP; and the web browser program which requests connection, (typically via a Web Proxy server), W/Server in order to connect to a site using HTTP (Request C). In the present example, outbound requests to the MCMS from each of these hosts are requests to send data to an identified destination host, and are ultimately manifested by the dispatch of one or more data packets in accordance with the relevant application protocol. The term "request" is intended to be interpreted broadly to encompass any indication (usually from an application program, although by no means necessarily) that contact with a destination host is sought, and for ease of terminology, the transmission of a request is to be interpreted as indicating that data is transmitted pursuant to a request to transmit such data.

Figure 6:
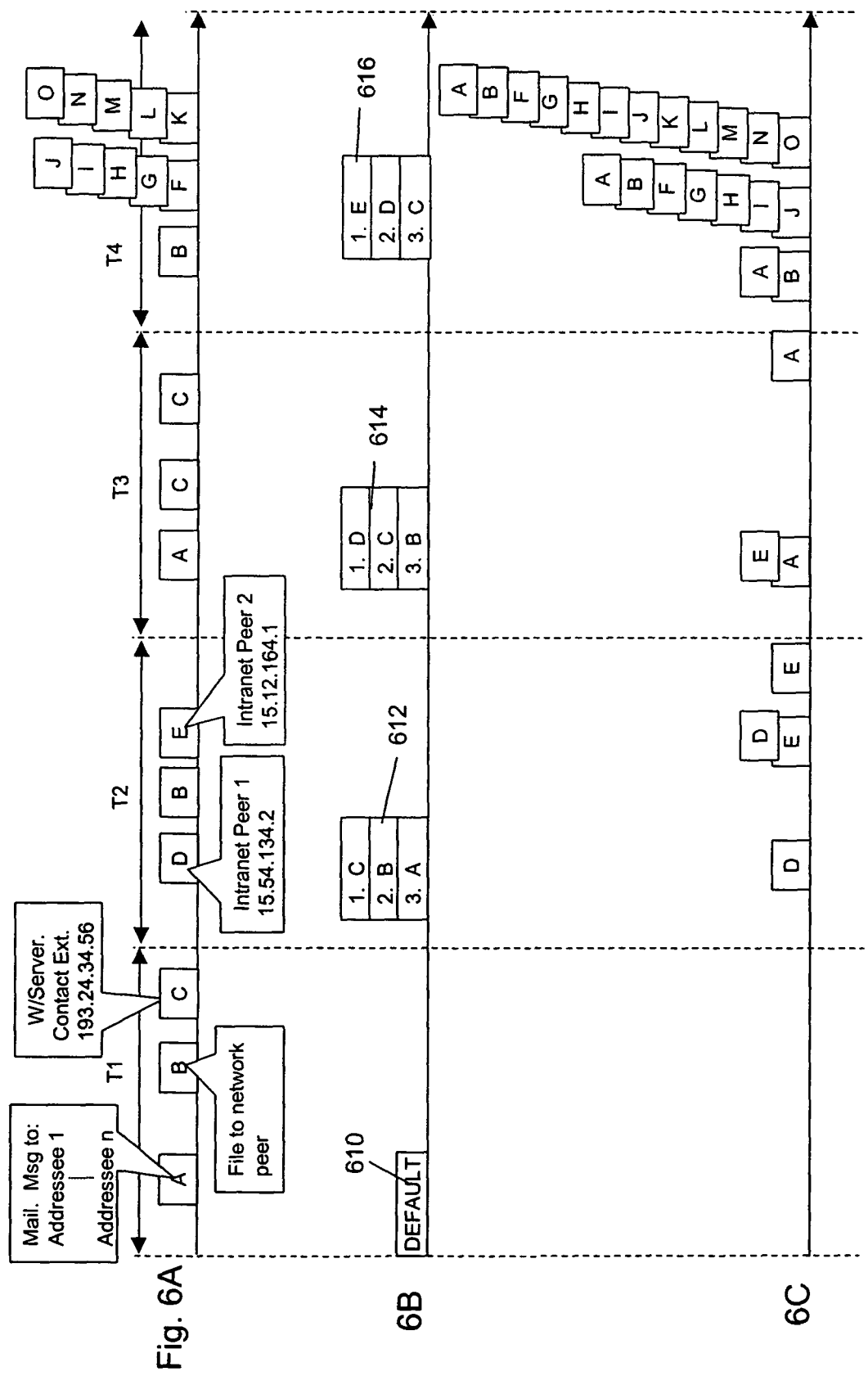
FIGS. 6A-C are a graphical representation of the operation of a method according to an embodiment.
Figure 7:
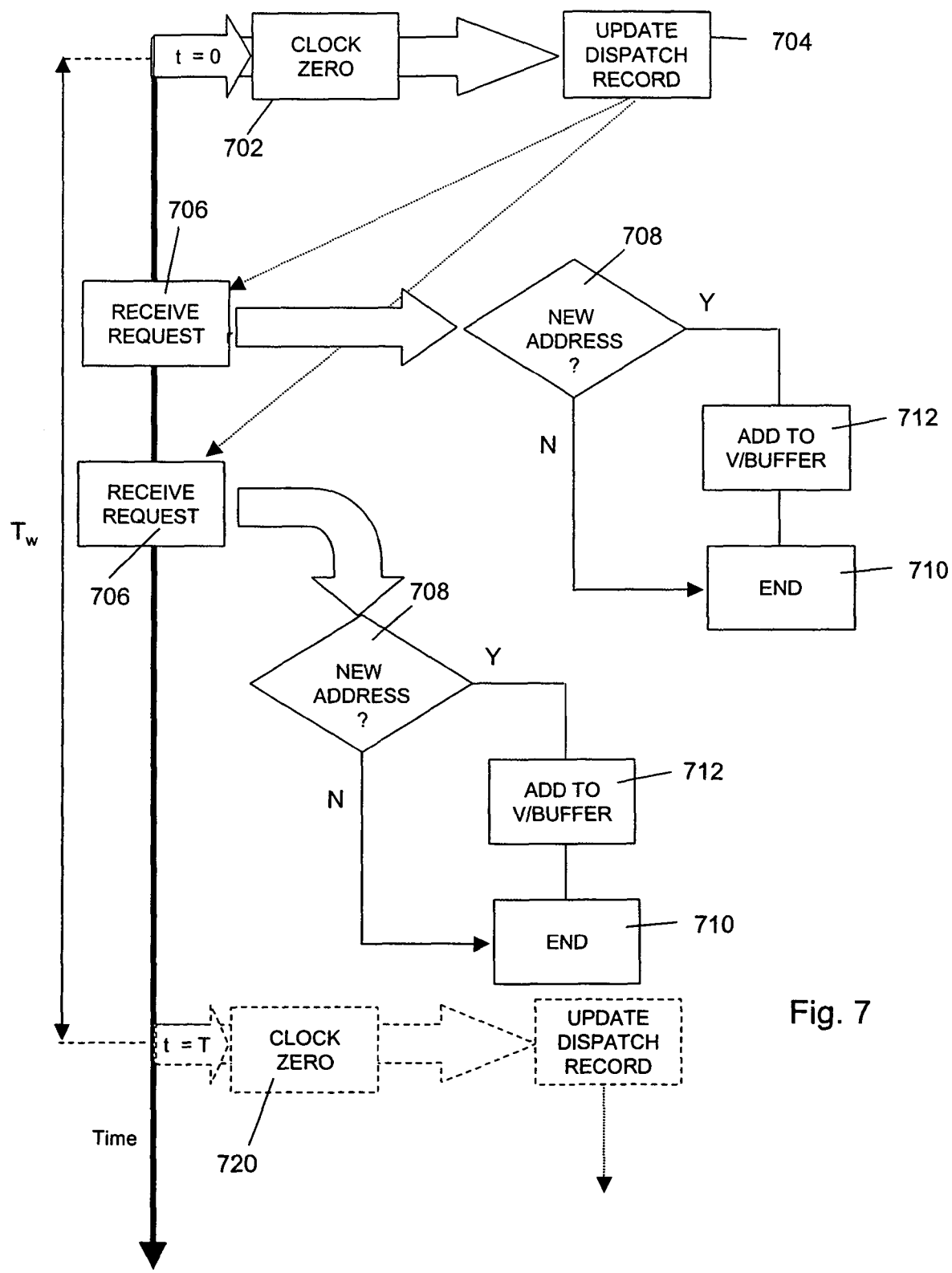
FIG. 7 is a flowchart illustrating the operation of the method of FIG. 6.

One manner of operation of the MCMS is illustrated in FIG. 7, whose features will now be described in more detail in conjunction with FIGS. 6A-C, although FIG. 7 should be regarded as a generic illustration of the operation of the MCMS routine, rather than a specific illustration of individual events depicted in FIGS. 6A-C. As explained above, the MCMS operates with reference to a series of time intervals, or windows, which in the present example are of constant length. The routine is initiated at step 702 by a clock (typically the clock which defines the time windows) indicating that a time window has commenced. At step 704 the routine then updates a dispatch record, the 'working set', which is a record of the identities of a predetermined number N (which in this example is 3) of destination hosts most recently contacted (in accordance with the policy—see later) in the previous time window are stored (and which are shown for each time window in FIG. 6B). At this point the routine is effectively in a waiting mode until a request to send data is received at step 706 (a dotted arrow from step 704 indicating that receipt of request occurs temporarily after step 704 but is not consequential to its occurrence). This is a step whose occurrence is entirely outside the control of the MCMS since it usually is initiated at the behest of an application program, as is the case with Requests A, B and C. Each of these requests passes through the relevant application protocol layer in the network stack from the respective application program by which they were generated, to the MCMS, and this event is labelled in FIG. 7 as step 706. Step 706 may be thought of as a triggering event, so that when a request passes into the MCMS, the identity of the requested destination host specified in the request is matched with the working set. This matching process therefore determines whether the requested destination host is a new host, and is represented at step 708. In the present example, somewhat artificially, but nonetheless serving to illustrate the desired principles, the time interval T1 is the first time interval after start-up of the computing entity. The MCMS therefore matches the destination host identities for each of the Requests A-C against identities held in a "default" working set 610 for the time period T1, which may be (and in the illustrated example, is) simply a record of the three hosts most frequently contacted during the lifetime of the host on which the MCMS is running. In the present example the three most frequently contacted hosts, and therefore the three identities retained in the default working set are those of the mail server (Request A), the file server (Request B) and the web proxy server (Request C). Since each of the three outbound requests from the workstation during the time period T1 identify a destination host matching one of the three host identities in the default working set, and therefore none of the Requests is seeking to establish contact with a new destination host, the MCMS therefore takes no action and simply ends at step 710.

During the course of the second time interval T2, three further outbound requests are received, identifying host destinations "Intranet Peer 1" (Request D), Request B (described above) and "Intranet Peer 2" (Request E) are received. As in the previous time window, as each request triggers an individual MCMS routine for that request, i.e. a step 706 as it passes through the MCMS, and is followed by the step 708 of matching the identity of the host destination in the request with the identities present in the working set 612 for this time window T2 is performed in order to establish whether the request is new. The working set however is now a genuine record of the identities of the three hosts contacted most recently during the previous time window T1 (although coincidentally this is identical to the default working set). Upon receipt of Request D, the consequently triggered MCMS routine for that request establishes at step 708 that the identity of this host is not in the working set 612, i.e. that it is a new destination host. It therefore proceeds to step 712, where it adds a copy of the Request D as an entry to a virtual buffer whose contents are shown in FIG. 6C, and then ends at 710. In one preferred embodiment, the entire contents of the socket relating to Request D are duplicated to form the entry in the virtual buffer. However in an alternative embodiment, where for example the payload is large, this is omitted. On receipt of Request B, the MCMS establishes at a step 708 that B is present in the working set, and so the MCMS routine ends at step 710. Request E is also a new request within the time window T2 and so at a step 712 the identity of host E is added to the virtual buffer.

Because receipt of requests are the trigger for the commencement of the routine illustrated in FIG. 7, neither the number of occasions in a given time window in which the MCMS routine is run, nor the timing of their commencement can be known in advance. Additionally, as illustrated in FIG. 7, it is possible for two (or indeed more, although only two are illustrated in FIG. 7) routines to be running in temporal overlap, since one may still be running when another is triggered by a further request. Similarly, a request may trigger the execution of the routine of FIG. 7 just prior to the end of a time window (a situation also illustrated in FIG. 7, with steps which occur at the end of a time window/the beginning of a subsequent time window being shown in dashed lines), so that the execution of the routine may overlap temporally with a part of the next time window. The approach taken by this particular embodiment to this issue of overlap is relatively simple: if at the commencement of time window Tn+1, the update of the working set for a previous time window Tn has been completed during the simultaneous running of a MCMS routine commenced in the previous time window Tn, but prior to execution the step 712 (adding a request to the virtual buffer) for that routine, the subsequent update of the virtual buffer in that step 712 will be treated as if performed for a request received in the current time window Tn+1. This approach has the benefit of being simple, although it may on occasions yield minor inaccuracies, with a request being recorded as being outside of the policy simply because processing of the request received and initially processed during one time window extended into the next time window, but this is not significant overall.

At the end of the time window T2, the virtual buffer contains two new requests. At this juncture (i.e. at end of time period T2), the policy which the MCMS is designed to monitor comes into play. In the present example, the policy provides that a single new host may be contacted per time interval. This element of the policy is monitored by a first buffer management routine, which is illustrated schematically in flowchart form in FIG. 8A, and begins at step 802 with the advent of a clock timeout, that is to say that the clock (not shown) which defines the time intervals Tn has completed another time period, following which, at step 803 the routine counts the number of requests in the virtual buffer to update the variable known as LogNo, this being the number of entries (each identifying a request) in the virtual buffer at any moment. At step 804 the routine determines whether there are any entries in the virtual buffer, and it does this by examining the value of LogNo, to determine whether it's greater than 0. If there are no entries in the virtual buffer the routine ends at step 806. In the present illustrated example however it can be seen that over the course of the time interval T2 entries for two requests, D and E have accumulated in the virtual buffer, and so the routine proceeds to step 808, at which the entry for the first request RQ1 (i.e. the one which has been in the buffer for the longest time) is deleted from the buffer. Optionally, at step 810, the routine then searches the buffer for other entries specifying the same destination host and deletes any such entries, since they are effectively regarded as one entry identity. Alternatively, step 810 can be omitted. This is followed at step 812 by updating the working set so that it accurately reflects the identity of the three hosts most recently contacted in accordance with policy. It should be noted that the working set does not therefore necessarily reflect the identities of hosts which have most recently actually been contacted, if requests to these hosts are outside of the policy. For example in this case the destination host of Request E, which although contacted, was not contacted in accordance with the policy of one new destination host per time interval. This updating of the working set can be seen reflected in FIG. 6B, where the working set contains the identities of Requests D, C, B. The final step in the first buffer management routine is the updating of the value of the variable LogNo denoting the size of the virtual buffer, which in this example, following the transmission of the Request D, is one (i.e. the single Request E). Thus, in present embodiment in the same way that the working set is a record of recent requests which have been transmitted in accordance with policy, at the end of each time interval the virtual buffer is effectively a record at any instant of requests which have been transmitted outside that policy.

One role of the virtual buffer is to enable a determination to be made with regard to whether the host upon which the MCMS is running is virally infected. One way in which this can be manifested is the size of the virtual buffer. A state of viral infection may therefore be defined in terms of the size of the buffer, and the stage of any such viral infection by the rate of change of the buffer size. This follows from the generally different behaviour of virally-related and non virally-related network traffic, in that non virally-related or "legitimate" network traffic usually involves contacting only a relatively small number of new destination hosts, whereas, because viruses tend to propagate by transmission to as many disparate destination hosts as possible, an instance of a large number of requests to contact a new destination host will typically be indicative of viral infection. The virtual buffer may be thought of as a queue of virtual new requests waiting for opportunities to be virtually transmitted in accordance with policy (since their "counterpart" real requests are simply transmitted without hindrance). The size of the virtual buffer is therefore one indication of whether there is viral infection, since a large buffer size is indicative of a large number of requests to contact a new host within a short space of time. An alternative indication of viral infection may be the existence of an increasing buffer size. Conversely, generally speaking a buffer size which is steadily declining from a relatively high value may be indicative of a temporary increase in legitimate traffic levels. It can be seen therefore that buffer size may be used to interpret the existence of viral infection with varying levels of complexity, the interpretation typically being something which is defined in the policy.

A second buffer management routine, illustrated in FIG. 8B monitors the virtual buffer, and is triggered by performance of step 814 from the routine of FIG. 8A, or from step 803, or from step 712 in FIG. 7 i.e. an update in the value of the variable LogNo. Following which, at decision step 842, the routine determines whether the size of the buffer is greater than a quantity Vi, which the policy has determined represents viral infection, whereupon at step 844 it generates a virus alert. This may simply be a visual alert to a user of the workstation 10, or a message to the network administrator, or both, or even a trigger for automated action to shut the network down, as desired. At step 846, the routine determines whether the variable Vi is increasing above a given rate, and if it is, issues a further warning indicating the onset of viral infection at step 848, following which the routine ends.

A situation in which the second buffer management routine generates a viral infection warning can be seen in FIGS. 6A-C. As mentioned previously, during time interval T3, a single Request A (which it will be recalled from the time interval T1 is to contact the mail server), and two Requests C are received. Because the working set 614 for this time interval does not contain Request A, it adds the identity of host A to the virtual buffer, but not the identify of host C. At the end of the time interval T3 the virtual buffer therefore contains Request E (stored in the virtual buffer since time interval T2) and Request A. Since only one new request is transmitted per time window in accordance with policy, and since Request E has been in the virtual buffer since time interval T2, whereas Request A has just been added, Request E is deleted from the virtual buffer (a process with may be thought of as "virtual transmission"), so that at the start of time interval T4 the virtual buffer contains only Request A. This indicates that at this point in time, since startup of the entity on which the MCMS is running, only one more request has been transmitted than the policy allows. The first Request for connection in time interval T4 is Request B, which illustrates that over the course of three time intervals, during which only normal network traffic has been transmitted, connection has only been requested to five different destination hosts. However, Request B is nonetheless defined as new because it's not in the working set 616 for time interval T4, and so the identity of host B is stored in the virtual buffer (this action being illustrated at the same point in the timeline in FIG. 6C). After receipt of request B, two groups of five virtually simultaneous requests are received: F-J, and K-O, and since these are also new, their identities are also added to the virtual buffer. Referring specifically to FIG. 6C during time interval T4, it can readily be seen that the virtual buffer has increased from a size of one, to 12, and in accordance with the policy, this is defined as viral infection, since in the present example a buffer size of greater than five generates this alert. Moreover, since the rate of change is positive and rapid (from 1 to 12 in a single time interval), this is indicative of the onset of infection. Thus the likelihood is that a substantial number of the requests transmitted during the course of time interval T4 have been virally related.

In the event that a viral warning is generated, various further actions may then be taken, the majority of which are directed toward finding out more about the nature of any possible virus. Specifically the type of information sought may typically include: the destinations to which a virus has been propagated, where applicable the application program or programs which it uses to propagate itself, and the action and behaviour of the virus. The nature of the information which may obtained directly from the virtual buffer, or which may be deduced therefrom depends to an extent upon the nature of the data stored in the virtual buffer, and the operating system of the host concerned. For example in the case of one preferred embodiment in which the virtual buffer simply copies the socket, including payload, the destination host will be recorded in the buffer, and possibly, in the case where the virus copies itself to the socket as the outgoing payload, also the virus. Additionally, where the operating system records an identifier in the socket denoting the application program requesting the socket, and an ability to map this process identifier to the requesting application program after the socket has been closed (remembering that the virtual buffer contains a copy of the socket, while the actual socket is transient since it is used to implement the request to send data and is then deleted), then the application program responsible for requesting data transmission can be identified. The use of the data in a socket is only one way in which to collect data relating to possible viral infection, and when using sockets, depending upon the extent of the data collected, the reliability of copying of the sockets is likely to vary. For example, if, as referenced above, the fullest data (including e.g. copies of the payload) is to be retained, further copies of the sockets in the virtual buffer (stored for example in a manner which tags them to the copy of the socket in the virtual buffer) are preferably made over time as the contents of the socket changes over time. However, because two functional elements within the host may cause a change in the data in a socket (e.g. the writing of outgoing data to a socket by an application program, and removal from the socket of outgoing data by the network stack), maintaining a complete record may nevertheless still be difficult simply from observing the contents of sockets.

In an alternative embodiment, the network stack additionally includes a layer 502 (illustrated in FIG. 5), known as a packet logger, known per se. According to one embodiment, when a viral warning is generated as a result of the virtual buffer size (the virtual buffer this embodiment still being made of a single copy of a socket), the logger 502 is switched on, and makes copies of outgoing packets. These may be all outgoing packets, or packets identified by one or more particular destination IP address, the identity of which may for example be established from the copies of the sockets in the virtual buffer. By logging packets complete information may be stored relatively easily, since, for example even in the case of large payloads, the individual packets carrying various parts of the payload may easily be aggregated using the SEQ and ACK numbers. Further, if desired, the use of the logger enables incoming packets from designated IP addresses to be logged, which may provide valuable information in circumstances for example where a virus has a "hand-shake" action with another host (i.e. sends back a packet to its originating host from a destination host) as part of its propagation process (as is the case, for example with the Nimda worm).

The relatively early provision of warning of viral infection is potentially extremely beneficial, since in the case of many viruses the rate at which they can establish infection accelerates over time. For example, in the case of the code red virus, it has been established that over the course of the first 16 hours, 10,000 hosts were infected, but that in the subsequent 8 hours the virus infected a further 340,000 hosts. The early collection of data on viral infection can thus enable action to be taken, either within the hosts within which infection has been detected, and/or within other hosts, which can substantially reduce the extent of subsequent infection.

In the scenario illustrated in connection with FIG. 6, a single outbound request (Request A) to the MCMS, specifying a single destination host, namely the mail server, actually contains a plurality of email messages to different specified addressees. This outbound request may therefore be thought of as a carrier request for a plurality of sub-requests, here having the form of putative email messages intended for dispatch from the mail server to a list of addressees specified within the outbound carrier request (similarly, the mail server may be thought of as acting as a proxy destination host for the ultimate addressees specified in the outbound carrier request). In this situation, allowing transmission of the data packet constituting the message to the mail server will in fact effectively allow the workstation to contact multiple other hosts within the network (i.e. the specified addressees) all of which may be new, even though, in accordance with the routine described in connection with FIG. 7, the outbound carrier request will only count as a single request which may not even be recognised as new if, as may be likely, the mail server is identified in the current working set. In such a situation therefore, if the MCMS operates simply to record in the virtual buffer those new destination hosts to be contacted per time window on the basis only of those destination hosts which are ostensibly identified in the outbound request, the desired monitoring of viral propagation may be circumvented or reduced, because a single outbound request specifying the mail server does not necessarily represent only a single email subsequently propagating through the network after processing and forwarding by the mail server.

In a modification of the embodiment thus far described therefore, the MCMS includes within its routine a step of identifying the application program by which an outbound request has been generated. Because certain applications programs are more likely than others to use outbound carrier requests which invoke the use of a proxy (for example the above-mentioned instance of email, or the case of a web browser program) it is possible in advance to specify criteria, based on the provenance of an outbound request, identifying those outbound requests likely to be carrier requests. If the packet is generated by one such specified application program, then the MCMS invokes the use of the application protocol concerned to reveal the identities of the destination hosts specified in the sub-requests; here the eventual addressees for whom the email message is intended. Once the identities of the genuine or ultimate addressees have been obtained, there are several options for processing the request. In accordance with one alternative the identities of the destination hosts specified in the sub-request can be regulated in accordance with the same policy which applies to all other requests, and they can be matched against the host identities within the working set in the manner previously described in the embodiment described in the above in FIGS. 6-8. Further was in which multiple-addressee email messages may be handled are discussed below.

Since in the case for example of email, the use of outbound carrier requests to a host acting as a proxy for the ultimate addressees of the email messages is the norm, it is, in a modification, possible for different versions of MCMS to run simultaneously, effectively operating in parallel with each other: one which applies to hosts specified in the outbound request (including carrier requests), and another which applies to hosts specified in any sub-requests identified by the email application program. In such a situation, each MCMS will operate independently on a category of requests which it is intended to process, using its own working set, and implementing a policy for outbound requests tailored to the traffic it is set up to control, for example in the manner previously described and illustrated in connection with FIGS. 6 and 7. The two policies may be the same (e.g. a working set of 3 identities, a time window of constant duration Tn, and one new host per outbound request/sub-request), or different as desired.

The choice of the length of the time window, the number of identities retained in a working set, and the number of new hosts to be allowed per time window are all dependent upon the likely "normal" performance of the network within which the MCMS is operating, and more particularly, the nature of the network traffic the MCMS is intended to control. Therefore, while a policy such as that illustrated in connection with FIGS. 6 and 7 may be effective in monitoring the propagation of viruses through the network to a rate of infection of one new host per time interval, it may also be susceptible to false warnings caused by non virally-related, or "legitimate" network traffic whose characteristic behaviour differs substantially from the policy the MCMS is implementing. To ameliorate this difficulty, it is possible to provide a version of MCMS for each application program from which network traffic emanates, with each MCMS implementing a policy tailored specifically to minimise the chance of false warnings with legitimate network traffic. Alternatively, in accordance with a further preferred embodiment, an individual MCMS is provided in respect of each application protocol which the hosting entity supports, and requests are routed to appropriate MCMS on the basis of the port identified in outgoing requests from application software.

In a further embodiment, the establishment of a record indicative of the normal traffic destination hosts, may be employed to restrict the propagation of viruses within a network, an example of which will now be described below with reference to FIGS. 9 to 14.

Figure 9:
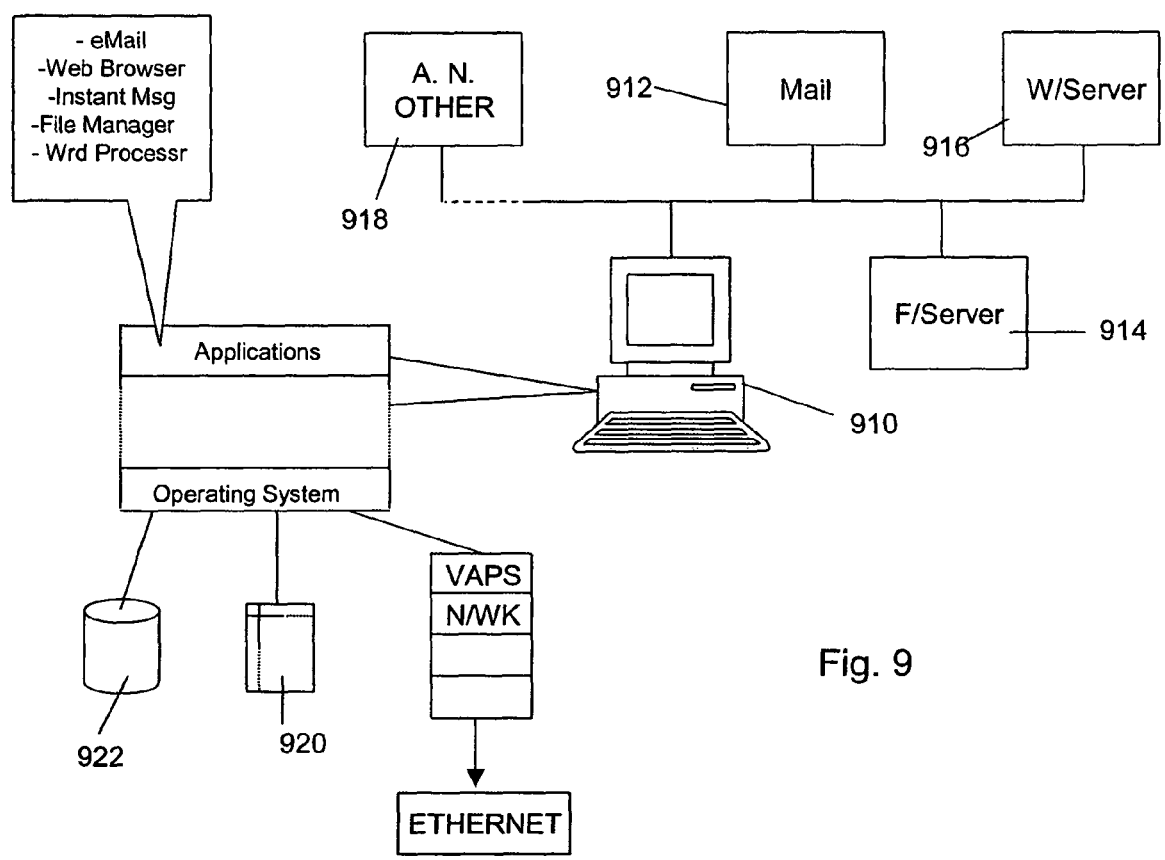
FIG. 9 is a schematic illustration of an information technology network.
Figure 10:
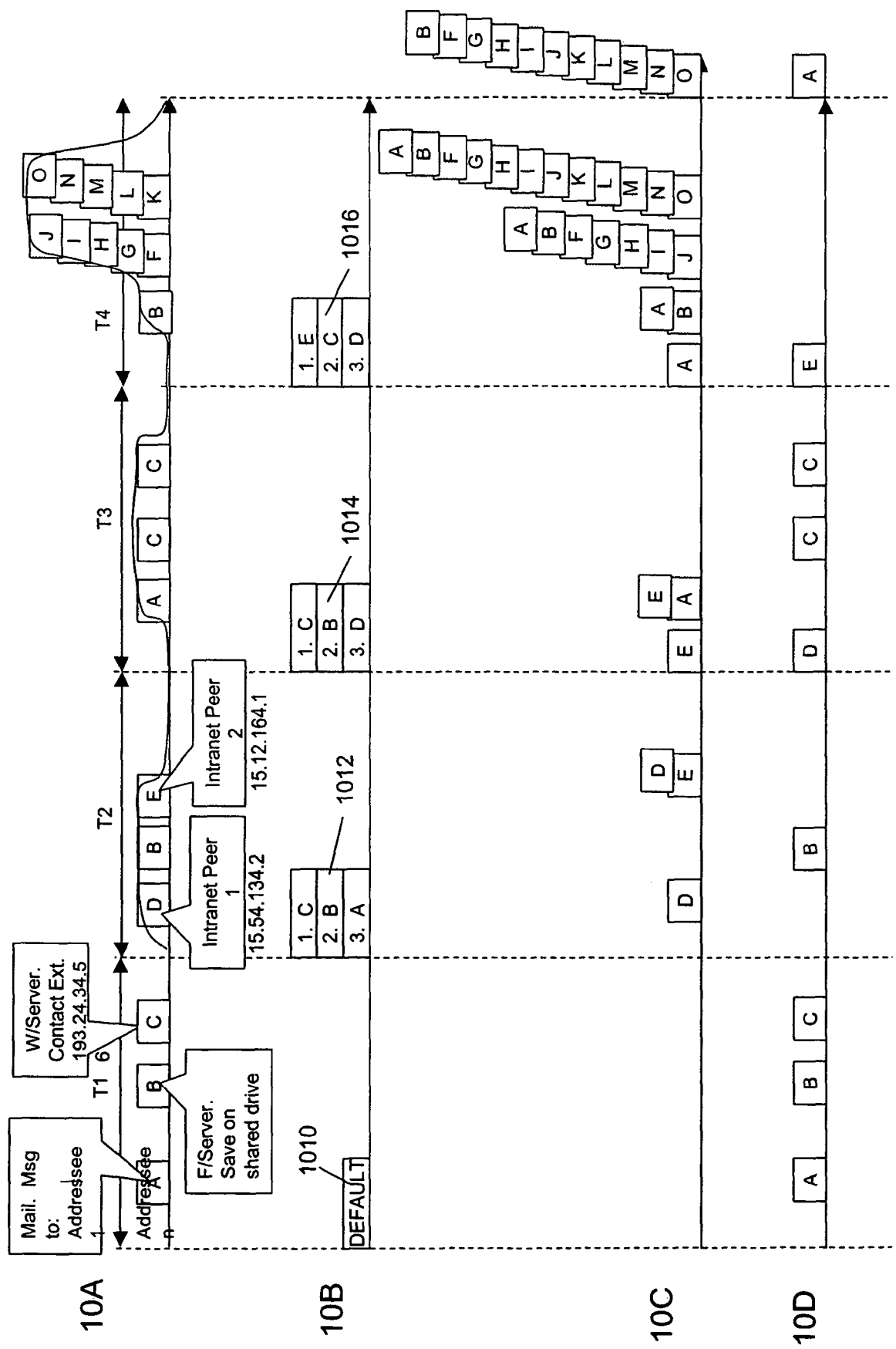
FIGS. 10A-D are schematic illustrations of network traffic from a first host of the network illustrated in FIG. 9, and the management of such network traffic.

Referring now to FIG. 9, a network, which as previously includes a plurality of interconnected hosts: a workstation 910 which is typically a personal computer for example, a mail server 912 ("Mail") which handles email communication within the network, a file server 914 ("F/Server") on which shared data within the network is stored, and a web proxy server 916 via which any communication between any host within the intranet and an external host passes. In addition the network includes further hosts not illustrated explicitly in FIG. 9, one of which 918 is illustrated under the denomination A. N. OTHER, and whose function within the network has no bearing upon the illustration of the present embodiment.

The workstation 910 runs a plurality of Application software programs concurrently; and as described in connection with FIG. 5, an operating system software and usual hardware of the workstation, such as memory 920, storage 922, with an Ethernet card. Examples of the sort of applications programs which run on the workstation 910 include programs to handle the receipt and dispatch of email from the mail server 912, a web browsing program, a file manager program enabling the organisation and transportation of files, and instant messaging software enabling the dispatch and receipt of ASCII text messages directly to and from peers within the network. In addition, and in accordance with the illustrated embodiment, a further software program, Malicious Code Throttling Software (MCTS or 'throttle'), runs within the network stack. Typically the MCMTS runs in the same position as the MCMS in FIG. 5 adjacent the networking software.

As with the MCMS the MCTS handles all requests to send outbound data from the workstation 910. The MCTS, however additionally operates to restrict or 'throttle' the propagation of viruses within the network by limiting the extent to which the workstation can engage in what may be thought of as "unusual" behaviour in contacting other hosts (in fact, the MCMS may correctly be thought of as a 'virtual throttle' because it performs all of the same operations except the physical restriction of outbound packets). As mentioned previously in connection with the MCMS, it has been established that in many networks, normal network traffic (i.e. non-virally related) is characterised by a relatively low rate of connection to hosts within the network which have previously not been contacted. In contrast, virally-related traffic is frequently characterised by a relatively high rate of connection, or attempted connection to previously uncontacted hosts. Broadly speaking, the function of the MCTS is to impede virally-related traffic, while allowing non-virally related traffic to flow with little or no impediment. In the present example the MCTS operates upon the basis of a series of time intervals or time windows, which in the present illustrated example are of predetermined and constant length Tn. In any given time window Tn the MCTS operates to prevent the host upon which it is running from transmitting requests to more than a predetermined number of "new" hosts, i.e. hosts whose identities differ from those specified in a working set of containing identities of destination hosts to whom requests have recently been transmitted. The working set only holds a predetermined number N of destination host identities, so that a destination host specified in a request is classified as new if it is not one of the N destination hosts to which a request has been transmitted. The number of new hosts allowed per time window, and the value of N are determined on the basis of a policy, typically defined by a system administrator, and the policy is preferably formulated to take account of the nature of non virally-related network traffic. In this way, the MCTS operates to limit the speed at which a virus resident on the host may propagate from that host to other hosts within the network.

Referring to FIG. 10A, over the course of the time window T1, various applications programs running on the workstation send requests to the MCTS to connect and send data to destination hosts within the network: the email application program, which requests dispatch of an email message (having multiple addressees) to the mail server 912, Mail (Request A), the file management application program requesting dispatch of a file to the file server 914, F/Server in order to save a text document on a shared network drive (Request B), and the web browser program which requests contact with the Web Proxy server 916, W/Server in order to contact a site external to the subnet within which the workstation 910 is located (Request C). as described above, requests to the MCTS from each of these hosts may be in form of requests to establish a connection to an identified destination host, or requests for use of connection all protocols and as previously, the term "request" is intended to be interpreted in the broad since indicated above to encompass any indication that contact with an identified destination host is required. A request for connection, if allowed, is followed by data typically in the form of data packets from the relevant application program transmitted to the identified destination host.

Figure 11:
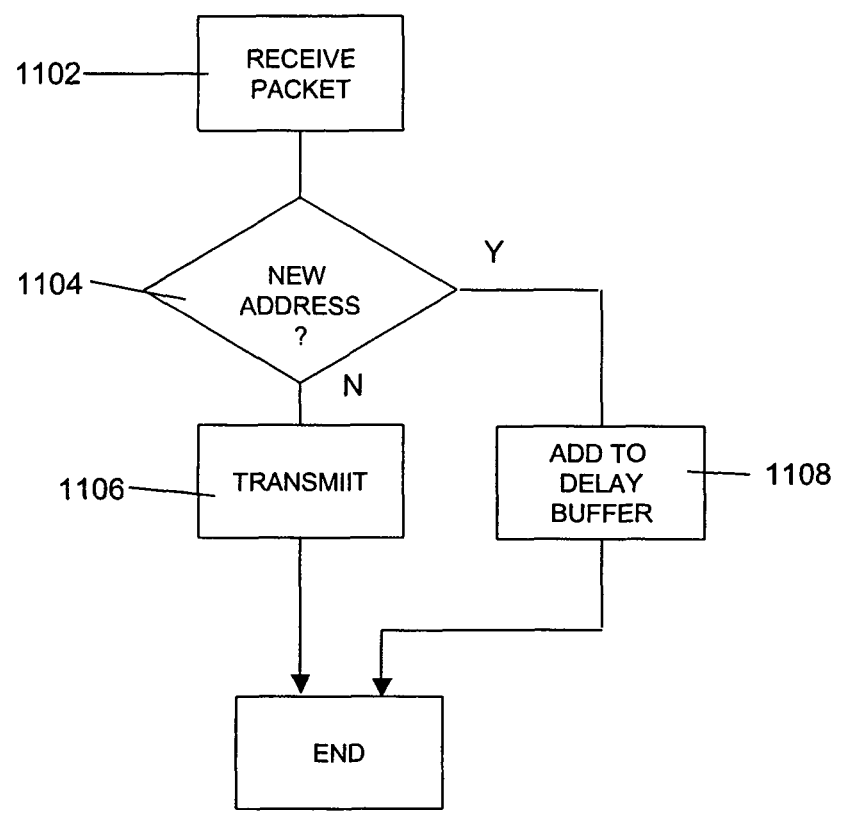
FIG. 11 is a flow chart illustrating operation of an aspect of a method according to one embodiment.

These requests are processed in accordance with in incoming request routine, forming part of the MCTS (illustrated in FIG. 11), and the various steps that take place during the course of this routine will now be described in more detail with reference to the graphical representations of FIGS. 10A-D in combination with the flowchart of FIG. 11. Subsequent to their generation by their respective applications programs, each of the outbound requests, hereinafter abbreviated as Requests A, B, C passes from the respective application by which they were generated, to the MCTS in the network stack, whereupon the process within the MCTS which processes the requests is initiated in step 1102. Upon passing into the MCTS, the identity of the requested destination host specified in each packet is matched with a working set in which the identities of a predetermined number N (which in this example is 3) of destination hosts most recently contacted in the previous time window are stored (and which are shown for each time window in FIG. 10B), in order to determine whether the requested destination host is a new host, as represented at step 1104. In the present example as previously, somewhat artificially, but nonetheless serving to illustrate the principles underlying embodiments of the present invention, the time interval T1 is the first time interval after start-up of the workstation 910. The MCTS therefore matches the destination host identities for each of the Requests A-C against identities held in a "default" working set 1010 for the time period T1, which may be (and in the illustrated example, is) simply a record of the three hosts most frequently contacted during the lifetime of the workstation. In the present example the three most frequently contacted hosts, and therefore the three identities retained in the default working set are those of the mail server 912 (Request A), the file server 914 (Request B) and the web proxy server 916 (Request C). Since each of the three outbound requests from the workstation during the time period T1 identify a host destination matching one of the three host identities in the default working set, and therefore none of the Requests is seeking to establish contact with a new destination host, the MCTS transmits each request at step 1106, and in the present example this means that it allows a connection with each of these hosts to be established. Transmission of the request is illustrated schematically on the graph of FIG. 10D, which has the same time scale as FIGS. 10A-C, meaning that the temporal relationship between events illustrated in each of these graphs can be readily appreciated.

During the course of the second time interval T2, three further outbound requests identifying host destinations "Intranet Peer 1" (Request D), Request B (which as indicated above corresponds to the File Server 914) and "Intranet Peer 2" (Request E) are received by the MCTS from: an instant messaging application program (in the case of Requests D and E), and the word processing application in the case of Request B. As in the previous time window, as each request passes to the MCTS, and as previously indicated in step 1104, the identity of the host destination in the request is matched with the identities present in the working set 1012. The working set however is now a genuine record of the identities of the three hosts to whom request have been transmitted most recently in accordance with the policy during the previous time window T1 (although coincidentally this is identical to the default working set). Upon receipt of Request D, the MCTS establishes at step 1014 that the identity of this host is not in the working set, i.e. that it is a new destination host, whereupon the request is denied, and is instead stored in a delay buffer step 1108. The delay buffer is effectively a queue of requests which have not been transmitted, and the contents of the delay buffer are illustrated schematically in FIG. 10C (the delay buffer is shown in FIG. 10C on each occasion that its contents change). It therefore follows that for each request illustrated in FIG. 10A, there is either a corresponding change in the delay buffer (illustrated in FIG. 10C) when the request is denied or transmission of the request (illustrated in FIG. 10D) when the request is transmitted (possibly accompanied by a change in the despatch record). Request B is processed as previously indicated, and given that B is present in the working set, this request is transmitted, which can be seen in FIG. 10D, while Request E, in a similar manner to that of the instance of Request D, is denied and added to the delay buffer, as illustrated in FIG. 10C.

Thus, at the end of the time period T2, no requests to new destination hosts have been transmitted, and the delay buffer contains two entries. At this juncture (i.e. at end of time period T2), the policy which the MCTS is designed to implement comes into play. In the present example, the policy provides that a single new host may be contacted per time interval. This element of the policy is implemented by a first buffer management routine, which is illustrated schematically in flowchart form in FIG. 12A, and begins at step 1202 with the advent of a clock timeout, that is to say that the clock (not shown) which defines the time intervals Tn has completed another time period. At step 1203 the routine determines whether there are any entries in the delay buffer (identifying new requests), and it does this using a variable known as LogNo, which is the number of entries in the delay buffer at any moment; if LogNo is not greater than 1 (step 1204), i.e. there are no entries in the delay buffer the routine ends at step 1206. In the present illustrated example however it can be seen that over the course of the time interval T2 two requests, D and E have occurred, causing two corresponding entries to accumulate in the buffer, and so the routine proceeds to step 1208, at which the first request RQ1 (i.e. the one which has been in the buffer for the longest time) is transmitted. Optionally, at step 1210, the routine then searches the buffer for other entries identifying requests specifying the same destination host and transmits any such requests, the logic behind this being that, in the event there is a virus in the first transmitted request RQ1, further copies of the virus are not likely to be deleterious to any greater extent. Alternatively, step 1210 can be omitted. This is followed at step 1212 by updating the working set so that it accurately reflects the identity of the three most recently contacted hosts, and in FIG. 10B it can be seen that the working set contains the identities D, C, B, which are the three most recently transmitted requests, as indicated in FIG. 10D in accordance with policy. The final step in the first buffer management routine is the updating of the value of the variable LogNo denoting the size of the buffer, which in this example, following the transmission of the request D, is one (i.e. the single request E). Thus, at the end of the time interval the buffer provides a record of requests occurring outside of the bounds of the policy.

The buffer size plays an important role in implementation by the MCTS of another aspect of the policy, in that it is possible, if desired, to define a state of viral infection in terms of the size of the buffer, and the stage of any such viral infection by the rate of change of the buffer size. This follows from the generally different behaviour if virally-related and non virally-related network traffic, in that non virally-related or "legitimate" network traffic usually involves contacting only a relatively small number of new destination hosts, whereas, because viruses tend to propagate by transmission to as many disparate destination hosts as possible, an instance of a large number of requests to contact a new destination host will typically be indicative of viral infection. Given that the buffer is effectively a queue of new requests waiting to be transmitted, the size of the buffer is one indication of whether there is viral infection, since a large buffer size is indicative of a large number of requests to contact a new host within a short space of time. In addition, if the buffer size is increasing, this is correspondingly indicative of the onset of viral infection, whereas a steadily declining buffer size, although large, will be indicative of the end of a viral infection.

A second buffer management routine, illustrated in FIG. 12B implements this part of the policy, and is triggered at step 1240 by the occurrence of an update of the value of LogNo (this being step 1214 in the first buffer management routine). This routine can also be triggered by step 1203, or step 1108 in FIG. 11. Following which, at decision step 1242, the routine determines whether the size of the buffer is greater than a quantity Vi, which the policy has determined represents viral infection, whereupon at step 1244 it generates a virus alert. This may simply be a visual alert to a user of the workstation 810, or a message to the network administrator, or both, or even a trigger for automated action to shut the network down, as desired. At step 1246, the routine determines whether the variable Vi is increasing above a given rate, and if it is, issues a further warning indicating the onset of viral infection at step 1248, following which the routine ends.

A situation in which the second buffer management routine generates a viral infection warning can be seen in FIGS. 10A-D. During time interval T3, a single Request A (which it will be recalled from the time interval T1 is to contact the mail server), and two Requests C are received. Because the working set 1014 for this time interval does not contain Request A, this request is denied and sent to the delay buffer, while the two Requests C are transmitted. At the end of the time interval T3 the buffer therefore contains Request E (stored in the delay buffer since time interval T2) and Request A, and in accordance with the policy, the first buffer management routine transmits Request E at the end of the time interval T3, meaning that at the start of time interval T4 the buffer contains only Request A. The first Request for connection in time interval T4 is Request B (the File Server), which illustrates that over the course of three time intervals, during which only normal network traffic has been transmitted, connection has only been requested to five different destination hosts. However, Request B is nonetheless defined as new because it's not in the working set 1016 for time interval T4, and so is sent to the buffer (this action being illustrated at the same point in the timeline in FIG. 10C). After receipt of request B, two groups of five virtually simultaneous requests are received: F-J, and K-O, and since these are also new, they are also added to the buffer upon receipt and processing. Referring specifically to FIG. 10C during time interval T4, it can readily be seen that the buffer has increased from a size of one, to 12, and in accordance with the policy, this is defined as viral infection, since in the present example a buffer size of greater than five generates this alert. Moreover, size the rate of change is positive and rapid (from 1 to 12 in a single time interval), this is indicative of the onset of infection.

In the example described above the MCTS has been configured to delay outbound requests, and as seen this has the advantage of being able to use the delay buffer to provide useful information. In addition, delaying outbound requests for connection is generally regarded as being compatible with the operation of many computer systems and networks. However, the MCTS may be configured to operate in a number of ways. For example, in accordance with an alternative embodiment, where the computer system permits, the MCTS may, having denied the request for connection, and simply return a suitable error message to the dispatching application program by which the packet was generated, and then delete the packet. In accordance with this embodiment the dispatching application program must, if the packet is eventually to be successfully dispatched then resend the packet the MCTS. In this alternative embodiment, the policy relating to the number of new requests which are to be transmitted per interval may be implemented by initialising a variable corresponding to the number of new requests received in a particular time interval, and augmenting this variable whenever a new request is received. Requests may then either be instantaneously transmitted (in the same manner as requests already in the working set) or denied and deleted on the basis of whether the variable indicative of the number of new requests per time interval has reached a maximum set in accordance with the policy (i.e. in the previous example, one).

In the present example, the working set lists transmitted requests in historical order, with the ordinal numbering signifying the temporal order in which the hosts where contacted, i.e. No. 1 indicating the host most recently contacted, and No. 3 indicating the host contacted the longest time previously (or "first in first out)". This is not essential, and it is equally possible to list the transmitted requests in another order, such as "first in last out" for example, or "least recently used".

In a similar way to that described in connection with the first embodiment, a single outbound request (Request A) to the MCTS, specifying a single destination host, namely the mail server, actually contains a plurality of email messages to different specified addressees. As previously, in such a situation therefore, if the MCTS operates simply to restrict the number of new destination hosts to be contacted per time window on the basis only of those destination hosts which are ostensibly identified in the outbound request, the desired restrictive effect on virus propagation may be circumvented or reduced, because a single outbound request specifying the mail server does not necessarily represent only a single email subsequently propagating through the network after processing and forwarding by the mail server.

As with the first embodiment, in a modification of the second embodiment thus far described, the MCTS includes within its routine a step of identifying the application program by which an outbound request has been generated. Because certain applications programs are more likely than others to use outbound carrier requests which invoke the use of a proxy (for example the above-mentioned instance of email, or the case of a web browser program) it is possible in advance to specify criteria, based on the provenance of an outbound request, identifying those outbound requests likely to be carrier requests. If the packet is generated by one such specified application program, then the MCTS invokes the use of the application program concerned to reveal the identities of the destination hosts specified in the sub-requests; here the eventual addressees for whom the email message is intended. Once the identities of the genuine or ultimate addressees have been obtained, there are several options for processing the request. In accordance with one alternative the identities of the destination hosts specified in the sub-request can be regulated in accordance with the same policy which applies to all other requests for connections, and they can be matched against the host identities within the working set in the manner previously described in the embodiment of FIG. 11. In the event that the message contains more new addressees than the policy which the MCTS is implementing will allow to be transmitted in a single time window, then what may be thought of as the surplus addressees may, depending upon the operation of the email program, either be purged from the list, and the message transmitted (such surplus messages may alternatively be dealt with in a different manner, which may also be specified in accordance with the policy), or preferably they are stored in a delay buffer as illustrated in connection with FIGS. 10 and 11.

Since in the case for example of email, the use of outbound carrier requests to a host acting as a proxy for the ultimate addressees of the email messages is the norm, it is, in a modification, possible for different versions of MCTS to run simultaneously, effectively operating in parallel with each other: one which applies to hosts specified in the outbound request (including carrier requests), and another which applies to hosts specified in any sub-requests identified by the email application program. In such a situation, each MCTS will operate independently, using its own working set, and implementing a policy for outbound requests tailored to the traffic it is set up to control, for example in the manner previously described and illustrated in connection with FIGS. 10 and 11. The two policies may be the same (e.g. a working set of 3 identities, a time window of constant duration Tn, and one new host per outbound request/sub-request), or different as desired.

The choice of the length of the time window, the number of identities retained in a working set, and the number of new hosts to be allowed per time window are all dependent upon the likely "normal" performance of the network within which the MCTS is operating, and more particularly, the nature of the network traffic the MCTS is intended to control. Therefore, while a policy such as that illustrated in connection with FIGS. 10 and 11 may be effective in limiting the propagation of viruses through the network to a rate of infection of one new host per time interval, it may also be susceptible to interfering with non virally-related, or "legitimate" network traffic whose characteristic behaviour differs substantially from the policy the MCTS is implementing. To ameliorate this difficulty, it is possible to provide a version of MCTS for each application program from which network traffic emanates, with each MCTS implementing a policy tailored specifically to minimise the level of impediment to legitimate network traffic.

Other kinds of legitimate network traffic which is predictable—in the sense that the fact of its occurrence is something which is known to occur, even though the timing of it may not be—and which may be restricted by throttling of outbound requests or, in the case of simply monitoring the nature of the traffic as illustrated in connection with FIG. 6, generate a false alarm. For example, PCs frequently, and as a matter of course when implementing UDP to dispatch data, emit Netbios bursts to many different host addresses.

One way in which legitimate network behaviour of this kind can be accommodated is by implementing a policy which permits a working set of any size, rather than limiting the working set to a predetermined size. A host identified in the working set is removed because it 'times out' when, over the course of a predetermined period of time, no data is dispatched to that host identity.

FIGS. 13A-D illustrate this, with, as previously, the requests received in a given time interval illustrated in FIG. 13A, the working set illustrated in FIG. 13B, the buffer illustrated in FIG. 13C and the transmitted packets illustrated at 13D. Referring to FIG. 13B, at the start of a time interval T1, the working set has three destination host identities: C, B and A. Over the course of time interval T1, requests are received to dispatch data to destination hosts D, B and E, illustrated in FIG. 13A. Request B is transmitted, since B is in the working set while requests D and E, not in the working set, are placed in a queue on the buffer, illustrated in FIG. 13C. Since the policy is to permit the dispatch of data to only a single destination host whose identity is not the working set over the course of each time interval, only request D, the first of the requests to dispatch data to a destination host not in the working set, is transmitted at the end of time interval T1. In accordance with the modified policy where the working set is not numerically limited in size, destination host D is then added to the working set. Accordingly, the working set for the interval T2 has grown to four destination host identities, as can be seen in FIG. 13B.

During time interval T2 requests are received to dispatch data to destination hosts A, B and D, all of which are already in the working set and thus are transmitted, while request E is similarly transmitted from the buffer as the single request not in the working set over time interval T2 whose transmission is permitted by the policy. Following transmission of request E, identity E is then added, at the start of time interval T3, to the working set, which has now grown in size to five. Requests are received in three groups during the course of time interval T3: a single request B; requests F, G H, I, J; and requests K, L M, N, O. Request B is transmitted instantly since B is an identity in the working set. The other two groups of requests are stacked onto the buffer, as illustrated in FIG. 13C. At the end of time interval T3 request F is then transmitted as the single request not in the working set whose transmission is permitted by policy, and, in accordance with the modified policy regarding the working set, destination host identity F is then added to the working set for time interval T4.

During time interval T4, no further requests are received. At the end of time interval T4 request G is transmitted, and will be added to the working set for time Interval T5 (not illustrated in FIG. 13). However, the policy under which destination host identities are added to the working set upon transmission of the corresponding request also operates to limit the size of the working set. Specifically, in the present example, a destination host identity is removed from the working set upon the passage of four time intervals during which no request bearing that identity is received. Another way of thinking of this is that each host identity is attributed a 'time to live' of four 'unused' time intervals. Thus, in the case of host identity C, no request to dispatch data to that destination host is received over time intervals T1-T4. Accordingly, destination host identity C is removed from the working set for the time interval T4, which therefore still contains five identities.

A further preferred modification takes account of the circumstances in which a host may seek to contact destination hosts which are not in the working set. One example of such a situation is where a host receives an incoming data packet via a connectionless protocol, such as UDP (UDP, being a connectionless protocol, no outgoing data packets need be transmitted in order to receive data packets containing a payload). Accordingly, in a preferred modification to the policy illustrated with reference to FIG. 13, a host identity is added to the working set if a data packet is received from that host. The received host identity can, according to one version of this policy, be attributed to the same 'time to live' as a destination host identity, in this example four unused time intervals. In yet a more refined version however, which seeks to take account of the fact that, if a host is to be contacted on the basis of a received data packet, this is likely to occur relatively quickly. Accordingly, in a preferred embodiment, received host identities are attributed with a shorter time to live than destination host identities. In one example, destination host identities can be attributed with a time to live of between, for example, 2 and 24 hours, while received host identities have a time to live of between 1 and 3 minutes, though these examples are not intended to be limiting. It should be appreciated, however, that if, during the time to live, data packets are transmitted to that identity, or are once again received from that identity, then the time to live of that identity in the working set is refreshed (with the corresponding time period—Four intervals for dispatch, two for receipt).

Figure 14:
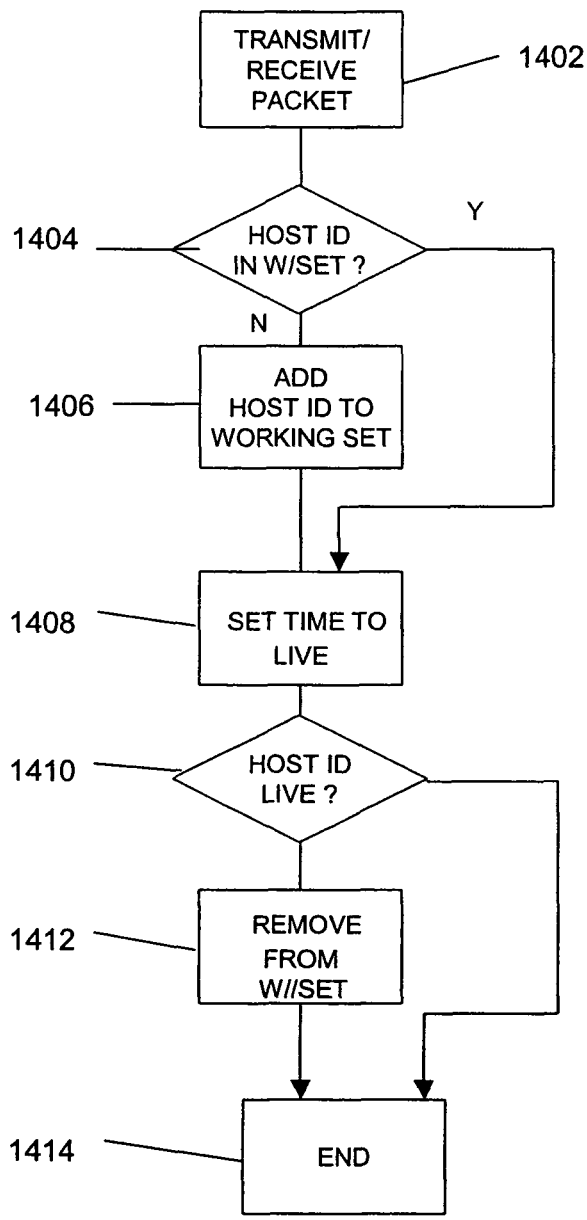
FIG. 14 is a flowchart of steps implementing the embodiment of method illustrated in FIGS. 13.

This policy is illustrated in flowchart form in FIG. 14. The routine is initiated by either the transmission of a packet (which includes within its definition, the case of a monitoring throttle as illustrated in connection with FIG. 6 where a destination host ID is removed from the buffer symbolising transmission in accordance with 'virtual throttling') or the receipt of packet at step 1402. Thereafter, at step 1404 a decision step determines whether the host ID of the transmitted or received packet is in the working set. If it is not, then it is added to the working set at step 1406, and at step 1408, a Time To Live is associated with the Identity. Typically this will be some time interval T for a transmitted packet, and less than that for a received packet.

If, at decision step 1404, it's determined that the host ID is in the working set, the routine skips to step 1408, and the Time To Live of the ID is reset, with the resetting taking place upon the basis of the status of the packet which initiated the routine. That is to say that in the case of a received packet, the Time To Live will be set at T/n (where n is greater than 1) and a transmitted packet at T. In a preferred embodiment, the time to live is a parameter which is not reduced. Thus, if a host ID has a time to live which has been attributed based upon the ID being a destination host, and a packet from that host ID is then received, the time to live is increased if the remaining time to live is smaller than the standard time to live for received packets, but not reduced if it is larger. At decision step 1410 the routine determines whether each of the host IDs in the working set is still 'live', that is to say whether their Time To Live has expired. Those IDs which have expired are removed from the working set at step 1412, and the routine ends at 1414.

The modified manner of administering the working set described in this embodiment may also be used in conjunction with monitoring software (i.e. which doesn't restrict the transmission of packets) such as that described earlier in this specification.

In a further modification, packets which aren't transmitted by the MCMS are not queued in a buffer for subsequent transmission, but instead are deleted. This embodiment will now be described in conjunction with the use of a variable size working set described in connection with FIG. 13, although it may, of course, be used in conjunction with a more 'conventional' working set as described earlier. Referring now to FIG. 15, the requests received in a given time interval are illustrated in FIG. 15A and the working set in FIG. 15B. Unlike FIG. 13C, however, FIG. 15C does not illustrate a buffer in which outbound packets are queued. Rather, the buffer illustrated in FIG. 15C is one which stores destination host addresses identified in outbound packets, not the packets themselves FIG. 15D illustrates the transmitted packets. Thus, the buffer illustrated in FIG. 15C may be thought of as a log of addresses in respect of which requests, in the form of outbound packets, have been generated.

Thus, in time interval T1 requests D, B and E are received. The working set contains the destination host IDs A, B and C, so B is transmitted instantly. The buffer stores the addresses of the destination hosts D and E, and at the end of time interval T1, request D is transmitted as the single permitted request not identified in the working set, and is then added to the working set for time interval T2. Request E, i.e. here the packet intended for transmission, rather than being stored, is then deleted. Thus, at the start of time Interval T2, the working set contains the destination host IDs A, B, C and D; and the address buffer identifies destination host E. Requests A, B and D received during time interval T2 are all transmitted instantly, since the corresponding destination host IDs are identified in the working set. Unlike an implementation in which packets are queued, illustrated in FIG. 13, however, request E has been deleted at the end of time interval T1 and so is not transmitted at the end of time interval T2 since it does not constitute a pending request. Rather, the destination host ID or 'address' of request E is stored as illustrated in FIG. 15C, and at the end of time interval T2 this is removed from the buffer in which it is stored and the destination host ID added to the working set as if the request had been transmitted. The buffer of stored addresses thus acts only to provide a warning mechanism of the level of outbound requested traffic, and may therefore be regarded as being indicative of whether there is a viral infection or not.

During time interval T3, requests B and F through to O are received. B is in the working set and is transmitted instantly. Since, none of the remaining requests identify destination hosts in the working set, only request F, the first-received of these requests, is transmitted at the end of time interval T3. The remainder of requests are deleted and their addresses added to the address buffer for the time interval T4, shown in FIG. 15C. During T4 no requests are received. In the present modification, in which requests/packets aren't queued in a buffer, and only addresses which are identified therein are, there are no 'stored' requests, and, accordingly, none of the requests G to O which were received during time interval T3 and not transmitted, are now transmitted. The contrast with the embodiment of FIG. 13 can be readily appreciated in that in FIG. 13D it can be seen that, because the packets are queued, request G is transmitted from a buffer.

This embodiment, in which packets are not queued, or rather to be precise, are queued for, at most, a period of time less than a single time Interval, saves memory space, since significantly less memory is required to stored an address identified in a packet than the whole packet. Thus, the modified version in which no packets are queued for any length of time at all saves yet further memory. Further, in many situations there is little or no negative effect from implementing such a policy. For example, in the case of connectionless protocols such as UDP, dropped packets are not unusual. Packets may be dropped due to collisions and in many streaming protocols a dropped or deleted packet may be preferable to sending one out of sequence. Further, TCP is sufficiently robust to deal with dropped packets if the resent occurs within a specified period of time; if not then the application concerned (e.g. a web browser) is likely to cause a further attempt to establish a connection.

In a modification of this embodiment, packets not in the working set are deleted instantly, rather than being queued for the remaining duration of the time interval in which they are received, with the result that only packets identifying destination hosts in the working set are transmitted.

The invention claimed is:

1. A method of restricting transmission of data packets from a host entity in a network, comprising:
   transmitting outgoing packets to destination hosts whose identities are contained in a record stored in a working set of host identity records;
   placing packets to destination hosts whose identities are not contained in the working set in a queue in a buffer;
   at the end of repeated predetermined time intervals, after the outgoing packets to destination hosts whose identities are contained in the working set have been transmitted, selecting, by a processor, a predetermined number of packets in the buffer in the order that the buffer receives the packets, and transmitting the selected packets to destination hosts whose identities are not contained in the working set;
   upon transmission of a packet to a destination host whose identity is not contained in a record in the working set, adding a record containing the destination host's identity to the working set and attributing a time to live to the record;
   deleting each record from the working set whose time to live has expired and when no packet is requested to be transmitted to the destination host during the time to live of the record.

2. The method according to claim 1 wherein, upon receipt of an incoming packet from a host whose identity is not contained in a record in the working set, adding a record of the host's identity to the working set and attributing a time to live to the record.

3. A method of restricting transmission of data packets from a host entity in a network, comprising:
   transmitting outgoing packets to destination hosts whose identities are contained in a record stored in a working set of host identity records;
   placing packets to destination hosts whose identities are not contained in the working set in a queue in a buffer;
   at the end of repeated predetermined time intervals, after the outgoing packets to destination hosts whose identities are contained in the working set have been transmitted, selecting, by a processor, a predetermined number of packets in the buffer in the order that the buffer receives the packets, and transmitting the selected packets to destination hosts whose identities are not contained in the working set;
   upon transmission of a packet to a destination host whose identity is not contained in a record in the working set, adding a record containing the destination host's identity to the working set and attributing a time to live to the record; and
   deleting each record from the working set whose time to live has expired and when no packet is requested to be transmitted to the destination host during the time to live of the record,
   wherein, upon receipt of an incoming packet from a host whose identity is not contained in a record in the working set, adding a record of the host's identity to the working set and attributing a time to live to the record, and
   wherein the time to live attributed to a record entered in respect of a host identified in an outgoing packet is greater than a time to live attributed to a record entered in respect of a host identified in an incoming packet.

4. The method according to claim 3 wherein the time to live of a record in the working set can be increased upon transmission or receipt of a packet, but not decreased.

5. The method according to claim 1 wherein packets in the buffer which have not been transmitted continue to be queued in the buffer.

6. The method according to claim 4 wherein packets in the buffer which have not been transmitted continue to be queued in the buffer for a period of time no greater than a single time interval, after which they are deleted.

7. The method according to claim 1 wherein packets in the buffer which have not be transmitted are deleted.

8. The method according to claim 1 wherein the host entity is selected from the group consisting of: a computer; a virtual computing environment partitioned from another virtual operating environment; an applications program.

9. A computer program storage device storing a program adapted to restrict transmission of packets from a host computing entity in a network, the program, when executed by a processor, being adapted to:
- permit transmission of outgoing packets to destination hosts whose identities are contained in a record stored in a working set of host identity records;
- place packets to destination hosts whose identities are not contained in the working set in a queue in a buffer;
- at the end of repeated predetermined time intervals, after the outgoing packets to destination hosts whose identities are contained in the working set have been transmitted, select a predetermined number of packets in the buffer in the order that the buffer receives the packets, and transmit the selected packets to destination hosts whose identities are not contained in the working set;
- upon transmission of a packet to a destination host whose identity is not contained in a record in the working set, add a record containing the destination host's identity to the working set and attribute a time to live to the record;
- delete each record from the working set whose time to live has expired and when no packet is requested to be transmitted to the destination host during the time to live of the record.

10. The computer program storage device according to claim 9 further adapted, upon receipt of an incoming packet from a host whose identity is not contained in a record in the working set, to add a record of the host's identity to the working set and attributing a time to live to the record.

11. A computer program storage device storing a program adapted to restrict transmission of packets from a host computing entity in a network, the program, when executed by a processor, being adapted to:
- permit transmission of outgoing packets to destination hosts whose identities are contained in a record stored in a working set of host identity records;
- place packets to destination hosts whose identities are not contained in the working set in a queue in a buffer;
- at the end of repeated predetermined time intervals, after the outgoing packets to destination hosts whose identities are contained in the working set have been transmitted, select a predetermined number of packets in the buffer in the order that the buffer receives the packets, and transmit the selected packets to destination hosts whose identities are not contained in the working set;
- upon transmission of a packet to a destination host whose identity is not contained in a record in the working set, add a record containing the destination host's identity to the working set and attribute a time to live to the record; and
- delete each record from the working set whose time to live has expired and when no packet is requested to be transmitted to the destination host during the time to live of the record,
- wherein the time to live attributed to a record entered in respect of a host identified in an outgoing packet is greater than a time to live attributed to a record entered in respect of a host identified in an incoming packet.

12. The computer program storage device according to claim 9 further adapted to delete packets in the buffer which have not be transmitted as a result of the selection.

13. A network of interconnected computing entities, each entity in the network being capable of sending packets to at least one other entity using programs implementing a hierarchy of networking protocols, one of the entities containing a further program which throttles transmission of malicious code, the further program, when executed by a processor, performing transmitting outgoing packets to destination hosts whose identities are contained in a record stored in a working set of host identity records;
- placing packets to destination hosts whose identities are not contained in the working set in a queue in a buffer;
- at the end of repeated predetermined time intervals, after the outgoing packets to destination hosts whose identities are contained in the working set have been transmitted, selecting, by the processor, a predetermined number of packets in the buffer in the order that the buffer receives the packets, and transmitting the selected packets to destination hosts whose identities are not contained in the working set;
- upon transmission of a packet to a destination host whose identity is not contained in a record in the working set, adding a record containing the destination host's identity to the working set and attributing a time to live to the record;
- deleting each record from the working set whose time to live has expired and when no packet is requested to be transmitted to the destination host during the time to live of the record.

14. A computer which is operably connected to one or more other computers, the computer restricting transmission of data packets to the other computers in the following manner:
- transmit outgoing packets to other computers which are identified in a record stored in a working set of computer identity records;
- place packets to other computers whose identities are not contained in the working set in a queue in a buffer;
- at the end of repeated predetermined time intervals, after the outgoing packets to the other computers whose identities are contained in the working set have been transmitted, select, by the computer, a predetermined number of packets in the buffer in the order that the buffer receives the packets, and transmit the selected packets to the other computers whose identities are not contained in the working set;
- upon transmission of a packet to another computer not identified in a record in the working set, add a record containing the another computer's identity to the working set and attribute a time to live to the record;
- delete each record from the working set whose time to live has expired and when no packet is requested to be transmitted to the other computers during the time to live of the record.

* * * * *

UNITED STATES PATENT AND TRADEMARK OFFICE
CERTIFICATE OF CORRECTION

| | | |
|---|---|---|
| PATENT NO. | : 9,143,524 B2 | Page 1 of 1 |
| APPLICATION NO. | : 11/494289 | |
| DATED | : September 22, 2015 | |
| INVENTOR(S) | : Jonathan Griffin et al. | |

It is certified that error appears in the above-identified patent and that said Letters Patent is hereby corrected as shown below:

In the Claims

In column 26, line 11, in Claim 13, delete "performing transmitting" and insert -- performing: transmitting --, therefor.

Signed and Sealed this
Nineteenth Day of April, 2016

Michelle K. Lee
*Director of the United States Patent and Trademark Office*